(12) United States Patent
Agrawal et al.

(10) Patent No.: US 12,118,545 B2
(45) Date of Patent: *Oct. 15, 2024

(54) KEY-VALUE MAP COMMITMENTS SYSTEM AND METHOD

(71) Applicant: Visa International Service Association, San Francisco, CA (US)

(72) Inventors: Shashank Agrawal, Sunnyvale, CA (US); Srinivasan Raghuraman, Cambridge, MA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,658

(22) Filed: Mar. 14, 2023

(65) Prior Publication Data

US 2023/0214826 A1 Jul. 6, 2023

Related U.S. Application Data

(63) Continuation of application No. 17/760,977, filed as application No. PCT/US2020/052864 on Sep. 25, 2020, now Pat. No. 11,636,470.

(Continued)

(51) Int. Cl.
*G06Q 20/38* (2012.01)
*G06Q 20/06* (2012.01)
*G06Q 20/40* (2012.01)

(52) U.S. Cl.
CPC ....... *G06Q 20/3827* (2013.01); *G06Q 20/065* (2013.01); *G06Q 20/3829* (2013.01); *G06Q 20/4014* (2013.01); *G06Q 20/409* (2013.01)

(58) Field of Classification Search
CPC ............ G06Q 20/065; G06Q 20/3829; G06Q 20/4014; G06Q 20/409; G06Q 20/3827

(Continued)

(56) References Cited

U.S. PATENT DOCUMENTS 8,453,226 B2 5/2013 Hammad
9,244,994 B1 1/2016 Adoc
(Continued)

FOREIGN PATENT DOCUMENTS

CN 102792325 A 11/2012
CN 110334154 A 10/2019
(Continued)

OTHER PUBLICATIONS

CN202080067418.8 , "Office Action", Jun. 16, 2023, 11 pages.
(Continued)

*Primary Examiner* — Neha Patel
*Assistant Examiner* — Yin Y Choi
(74) *Attorney, Agent, or Firm* — Kilpatrick Townsend & Stockton LLP

(57) ABSTRACT

A method includes a validation computer receiving an authorization request message comprising a user state and a user proof from a user device. The user state comprises first and second user state elements. The user proof comprises first, second, and third user proof elements. The validation computer computes a first verification value by multiplying the first user proof element raised to the power of the second user state element, and the second user proof element raised to the power of the first user state element. The computer computes a second verification value by raising the second user proof element to the power of the second user state element. The computer compares the first verification value to a first accumulated state element of an accumulated state. The compares the second verification value to a second accumulated state element. The validation computer authorizes the authorization request message based on the comparison steps.

20 Claims, 7 Drawing Sheets

Related U.S. Application Data

(60) Provisional application No. 62/905,966, filed on Sep. 25, 2019.

(58) Field of Classification Search
USPC .......................................................... 705/64
See application file for complete search history.

(56) References Cited

U.S. PATENT DOCUMENTS

| | | | |
|---|---|---|---|
| 11,636,470 | B2 | 4/2023 | Agrawal et al. |
| 2016/0260169 | A1* | 9/2016 | Arnold et al. ......... G06Q 20/10 |
| 2018/0276666 | A1* | 9/2018 | Haldenby et al. ..... G06Q 40/04 |
| 2019/0058604 | A1* | 2/2019 | Toll et al. ................. H04L 9/50 |
| 2019/0251527 | A1 | 8/2019 | Surdak |

FOREIGN PATENT DOCUMENTS

| | | | | |
|---|---|---|---|---|
| CN | 110597835 A | | 12/2019 | |
| CN | 110675149 A | | 1/2020 | |
| CN | 2019072278 A2 | * | 9/2021 | ............. G06F 21/62 |
| WO | 2019072278 A2 | | 4/2019 | |

OTHER PUBLICATIONS

Qiang et al., "Design and Implementation of Expandable RSA Cryptographic Chip", Henan Science, vol. 27, No. 10, Oct. 15, 2009, pp. 1270-1273.
"Bitcoin", Available online at https://bitcoin.org/, 2009, pp. 1-4.
"Ethereum", Available online at https://www.ethereum.org/, 2022, pp. 1-13.
"Etherscan", The Ethereum Blockchain Explorer, Available online at https://etherscan.io/, 2022, 2 pages.
"Evolution of the Total Number of Ethereum Accounts", Available online at https://www.etherchain.org/charts/totalAccounts, 2021, 2 pages.
U.S. Appl. No. 17/760,977, "Non-Final Office Action", Aug. 16, 2022, 10 pages.
U.S. Appl. No. 17/760,977, "Notice of Allowance", Dec. 21, 2022, 10 pages.
Baldimtsi et al., "Accumulators with Applications to Anonymity-Preserving Revocation", 2017 IEEE European Symposium on Security and Privacy, Apr. 2017, 37 pages.
Boneh et al., "Batching Techniques for Accumulators with Applications to IOPs and Stateless Blockchains", Cryptology, Available online at: https://eprint.iacr.org/2018/1188.pdf, 2019, 46 pages.
Boneh et al., "Constraining Pseudorandom Functions Privately", Available online at https://www.researchgate.net/publication/299427724_Constraining_Pseudorandom_Functions_Privately, Mar. 2017, pp. 1-64.
Boneh et al., "Key Homomorphic PRFs and Their Applications", Annual Cryptology Conference, Available online at https://link.springer.com/content/pdf/10.1007%2F978-3-642-40041-4_23.pdf, Aug. 18, 2013, 19 pages.
Camacho et al., "On the Impossibility of Batch Update for Cryptographic Accumulators", LATINCRYPT'10: Proceedings of the First international conference on Progress in cryptology: cryptology and information security in Latin America, Aug. 2010, 8 pages.
Catalano et al., "Vector Commitments and Their Applications", International Workshop on Public Key Cryptography, vol. 7778, Available online at https://www.iacr.org/archive/pkc2013/77780054/77780054.pdf, 2013, 18 pages.
Chepurnoy et al., "Edrax: A Cryptocurrency with Stateless Transaction Validation", Cryptology, Available Online at: https://eprint.iacr.org/2018/968.pdf, 2018, 18 pages.
Cramer et al., "Signature Schemes Based on the Strong RSA Assumption", Available online at https://inst.eecs.berkeley.edu/~cs276/fa20/notes/Cramer-Shoup.pdf, Dec. 6, 1998, pp. 1-13.
EP20869404.2, "Extended European Search Report", Oct. 18, 2022, 5 pages.
Fouque et al., "Close to Uniform Prime Number Generation with Fewer Random Bits", IEEE Transactions on Information Theory, Jun. 27, 2014, 16 Pages.
Goldreich et al., "How to Construct Random Functions", Journal of the Association for Computing Machinery, vol. 33, No. 4, Oct. 1986, pp. 792-807.
Hastad et al., "A Pseudorandom Generator from any One-Way Function", SIAM Journal on Computing, vol. 28, No. 4, Feb. 1999, pp. 1-46.
Hohenberger et al., "Short and Stateless Signatures from the RSA Assumption", Lecture Notes in Computer Science, International Association for Cryptologic Research, vol. 5677, Aug. 2009, pp. 654-670.
LIPMAA, "Secure Accumulators from Euclidean Rings without Trusted Setup", International Conference on Applied Cryptography and Network Security, Available online at https://link.springer.com/content/pdf/10.1007/978-3-642-31284-7_14.pdf, Jun. 26, 2012, pp. 224-240.
Naor et al., "Pseudo-Random Functions and Factoring", Available online at https://citeseerx.ist.psu.edu/viewdoc/download?doi=10.1.1.15.8440&rep=rep1&type=pdf, Dec. 12, 2001, pp. 1-23.
PCT/US2020/052864, "International Preliminary Report on Patentability", Apr. 7, 2022, 6 pages.
PCT/US2020/052864, "International Search Report and Written Opinion", Jan. 5, 2021, 9 pages.
Wesolowski, "Efficient Verifiable Delay Functions", Annual International Conference on the Theory and Applications of Cryptographic Techniques, Apr. 24, 2019, pp. 1-29.

* cited by examiner $$A_X = \left( g^{\sum_{i\in[q]} x_i} \prod_{j\in[q]\setminus\{i\}} z_j, \prod_{i\in[q]} g^{z_i}, q \right)$$

FIG. 5A $$W_{x_k} = \left( g^{\sum_{i\in[q]\setminus\{k\}} x_i} \prod_{j\in[q]\setminus\{i,k\}} z_j, \prod_{i\in[q]\setminus\{k\}} g^{z_i}, k \right)$$

FIG. 5B $$w_{x_k,1}^{z_{w_{x_k},3}} \cdot w_{x_k,2}^{x_{w_{x_k},3}} = \left( g^{\sum_{i \in [q] \setminus \{k\}} x_i \prod_{j \in [q] \setminus \{i,k\}} z_j} \right)^{z_k} \cdot \left( g^{\prod_{i \in [q] \setminus \{k\}} z_i} \right)^{x_k}$$

$$= g^{\sum_{i \in [q] \setminus \{k\}} x_i \prod_{j \in [q] \setminus \{i,k\}} z_j} \cdot g^{x_k \prod_{j \in [q] \setminus \{k\}} z_j}$$

$$= g^{\sum_{i \in [q]} x_i \prod_{j \in [q] \setminus \{i\}} z_j}$$

$$= A_{X,1}$$

FIG. 5C $$z_{w_{x_k},3} = \left( \prod_{i \in [q]\setminus\{k\}} g^{z_i} \right)^{z_k}$$

$$w_{x_k,2} = \prod_{i \in [q]} g^{z_i}$$

KEY-VALUE MAP COMMITMENTS SYSTEM AND METHOD

CROSS-REFERENCE TO RELATED APPLICATIONS

This application is a Continuation of U.S. application Ser. No. 17/760,977, filed on Mar. 16, 2023, which is a National Stage of International Application No. PCT/US2020/052864, filed Sep. 25, 2020, which claims the benefit of U.S. Provisional Application No. 62/905,966, filed on Sep. 25, 2019, which are herein incorporated by reference in their entirety for all purposes.

BACKGROUND

Cryptocurrencies like Bitcoin [bit] and Ethereum [ethb] process payments in a decentralized manner. Every time a block of transactions is generated, validators check the validity of the block. For example, in Ethereum, a transaction consists of a sender's public key pk, a transfer amount b, and a signature σ (among other things). For every transaction in a block, validators check that the signature σ is valid and that the sender account (identified by hashing the sender's public key pk) has a balance of at least the transfer amount b. While the signature σ can be verified given the transaction alone, the sender's balance depends on the past transactions. A validator could go through the entire chain of blocks (e.g., a blockchain) to compute the balance initially. The validator could store the balance in memory afterwards and update it as new transactions arrive.

The number of sender accounts, however, is usually large. Ethereum has about 70 million accounts [etha] even though the throughput of the blockchain is not high (e.g., 5-10 transactions per second [ethc]). Other currencies like Libra [lib] can have a much higher throughput and are expected to have billions of accounts. Fast access to such a large number of accounts requires significant resources, limiting the number of nodes that could perform validator functions. This is a problem for networks that want to spread far and wide without entrusting a few computers.

Embodiments of the invention address these and other issues, individually and collectively.

BRIEF SUMMARY

An embodiment includes a method comprising: receiving, by a validation computer, an authorization request message from a user device, wherein the authorization request message comprises a user state and a user proof, wherein the user state comprises a first user state element and a second user state element, and wherein the user proof comprises a first user proof element, a second user proof element, and a third user proof element; computing, by the validation computer, a first verification value by multiplying the first user proof element raised to the power of the second user state element, and the second user proof element raised to the power of the first user state element; computing, by the validation computer, a second verification value by raising the second user proof element to the power of the second user state element; comparing, by the validation computer, the first verification value to a first accumulated state element of an accumulated state; comparing, by the validation computer, the second verification value to a second accumulated state element of the accumulated state; and authorizing, by the validation computer, the authorization request message if the first verification value matches the first accumulated state and the second verification value matches the second accumulated state element.

Another embodiment includes a validation computer comprising: a processor; a memory; and a computer-readable medium coupled to the processor, the computer-readable medium comprising code executable by the processor for implementing a method comprising: receiving an authorization request message from a user device, wherein the authorization request message comprises a user state and a user proof, wherein the user state comprises a first user state element and a second user state element, and wherein the user proof comprises a first user proof element, a second user proof element, and a third user proof element; computing a first verification value by multiplying the first user proof element raised to the power of the second user state element, and the second user proof element raised to the power of the first user state element; computing a second verification value by raising the second user proof element to the power of the second user state element; comparing the first verification value to a first accumulated state element of an accumulated state; comparing the second verification value to a second accumulated state element of the accumulated state; and authorizing the authorization request message if the first verification value matches the first accumulated state and the second verification value matches the second accumulated state element.

Another embodiment includes a method comprising: generating, by a user device, an authorization request message comprising a user state and a user proof, wherein the user state comprises a first user state element and a second user state element, and wherein the user proof comprises a first user proof element, a second user proof element, and a third user proof element; providing, by the user device, the authorization request message to a validation computer of a plurality of validation computers, wherein the validation computer 1) computes a first verification value by multiplying the first user proof element raised to the power of the second user state element, and the second user proof element raised to the power of the first user state element, 2) computes the second verification value by raising the second user proof element to the power of the second user state element, 3) compares the first verification value to a first accumulated state element of an accumulated state, 4) compares the second verification value to a second accumulated state element of the accumulated state, and 5) authorizes the authorization request message if the first verification value matches the first accumulated state and the second verification value matches the second accumulated state element; and receiving, by the user device, an authorization response message from the validation computer, wherein the authorization response message indicates whether or not the authorization request message was authorized.

Further details regarding embodiments of the invention can be found in the Detailed Description and the Figures.

BRIEF DESCRIPTION OF THE DRAWINGS

FIGS. 5A-5D illustrate various equations according to embodiments.

DETAILED DESCRIPTION

Figure 1:
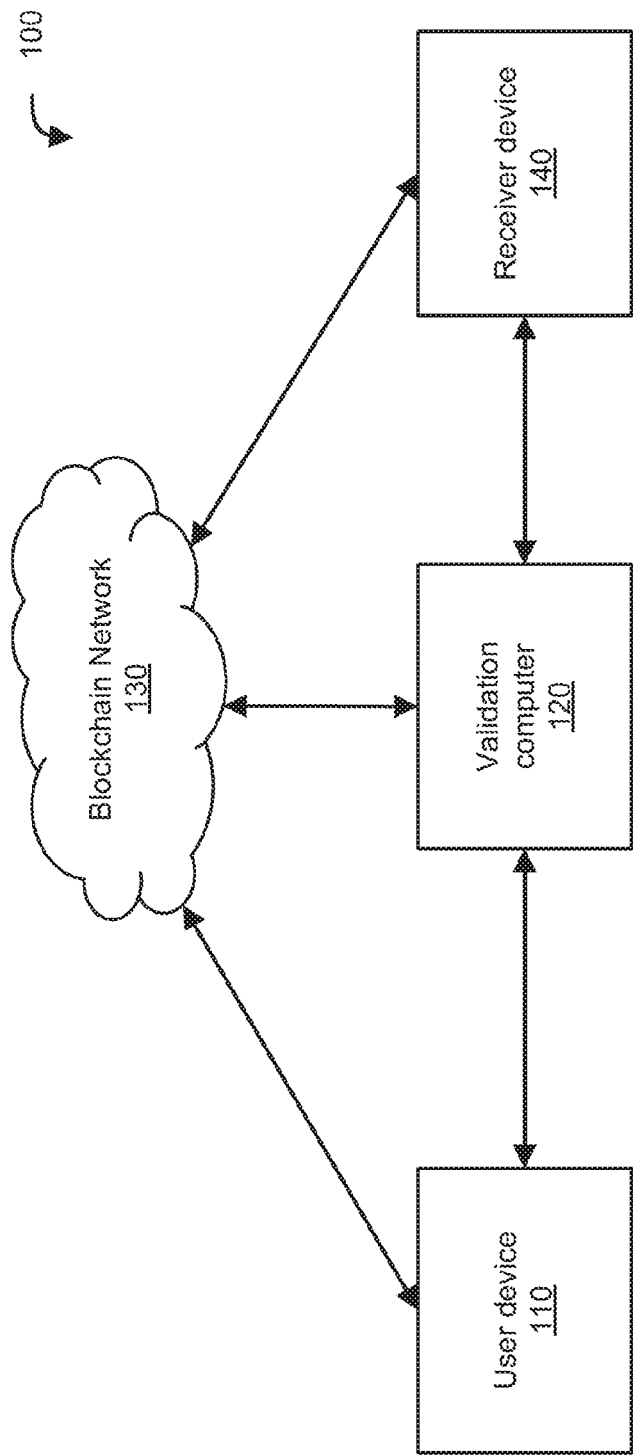
FIG. 1 shows a block diagram of a system according to embodiments.

A "blockchain" can be a distributed database that maintains a continuously-growing list of records secured from tampering and revision. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions.

A "verification network" can include a set of computers programmed to provide verification for an interaction. A verification network may be a distributed computing system that uses several computers (e.g., validation computers) that are interconnected via communication links. A verification network may be implemented using any appropriate network, including an intranet, the Internet, a cellular network, a local area network or any other such network or combination thereof. In some cases, validation computers may be independently operated by third party or administrative entities. Such entities can add or remove computers from the verification network on a continuous basis. In some embodiments, a validation computer in a verification network may be a full node.

A "block" can include a data element that holds records of one or more interactions, and can be a sub-component of a blockchain. A block can include a block header and a block body. A block can include a batch of valid interactions that are hashed and encoded into a Merkle tree. Each block can include a cryptographic hash of the prior block (or blocks) in the blockchain.

A "block header" can be a header including information regarding a block. A block header can be used to identify a particular block an a blockchain. A block header can comprise any suitable information, such as a previous hash, a Merkle root, a timestamp, and a nonce. In some embodiments, a block header can also include a difficulty value.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" may be data associated with an interaction. For example, an interaction may be a transfer of a digital asset from one party to another party. The interaction data for example, may include a transaction amount and unspent transaction outputs (UTXOs). In some embodiments, interaction data can indicate different entities that are party to an interaction as well as value or information being exchanged. Interaction data can include an interaction amount, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction data can be transaction data.

A "digital asset" may refer to digital content associated with a value. In some cases, the digital asset may also indicate a transfer of the value. For example, a digital asset may include data that indicates a transfer of a currency value (e.g., fiat currency or crypto currency). In other embodiments, the digital asset may correspond to other non-currency values, such as access privileges data (e.g., a number of authorized usages or a time allotment for accessing information) and ownership data (e.g., digital right data). A digital asset may also include information about one or more digital asset attributes. For example, a digital asset may include information useful for transferring value from one entity or account to another. A digital asset may also include remittance information (e.g., information identifying a sending entity). In some embodiments, a digital asset may include one or more of a digital asset identifier, a value (e.g., an amount, an original currency type, a destination currency type, etc.), transfer fee information, a currency exchange rate, an invoice number, a purchase order number, a timestamp, a sending entity identifier (e.g., a sender enterprise ID), a sending entity account number, a sending entity name, sending entity contact information (e.g., an address, phone number, email address, etc.), sending institution information (e.g., a financial institution name, enterprise ID, and BIN), a recipient entity identifier (e.g., a recipient enterprise ID), a recipient entity account number, a recipient entity name, recipient entity contact information (e.g., an address, phone number, email address, etc.), and/or recipient institution information (e.g., a financial institution name, enterprise ID, and BIN). When a digital asset is received, the recipient may have sufficient information to proceed with a settlement transaction for the indicated value.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "user" may include an individual. In some embodiments, a user may be associated with one or more personal accounts and/or mobile devices. The user may also be referred to as a cardholder, account holder, or consumer in some embodiments.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

A "validation computer" can include a computer that checks or proves the validity or accuracy of something. A validation computer can validate a user proof received from a user device. A validation computer can determine whether or not the user proof and/or any other provided data is sufficient for the user device to perform an interaction. A validation computer can be a node in a verification network. In some embodiments, a validation computer can propose to add a new block to a blockchain, where the new block includes one or more interactions.

An "authorization request message" can be an electronic message that requests authorization for an interaction. In some embodiments, an authorization request message is sent to a validator computer to request authorization for a transaction.

An "authorization response message" can be a message that responds to an authorization request. In some cases, it may be an electronic message reply to an authorization request message generated by a validation computer. The authorization response message may include, by way of example only, one or more of the following status indicators: Approval—transaction was approved; Decline—transaction was not approved; or Call Center—response pending more information, merchant can call the toll-free authorization phone number. The authorization response message, or data included therein, may serve as proof of authorization.

A "user state" can include a condition of attributes or status of user data. A user state can be a tuple and can include one or more user state elements. For example, a user state can include a first user state element and a second user state element. A user state can include a first user state element (e.g., $x_k$) that can be an amount (e.g., a balance, value, etc.) associated with an account of a user. A user state can include a second user state element (e.g., $z_k$) that can be a random value.

A "user proof" can include evidence sufficient to establish a thing provided by a user as true. A user proof can be referred to as a witness and can be a proof of membership of an element in an accumulated state. A user proof can be tuple that can include one or more user proof elements. For example, a user proof can include a first user proof element, a second user proof element, and a third user proof element. A user proof can include a first user proof element and a second user element that can be utilized by a validation computer to verify that a corresponding user state is included in an accumulated state of a most recent block in a blockchain. A user proof can include a third user proof element that can indicate which of a number of entries in an accumulated state a user is associated with (e.g., which of a number of first user state elements from a plurality of users included in the accumulated state is the user associated with).

A "verification value" can include a value utilized to verify something. A verification value can be determined based on provided information and then compared to known (e.g., previously stored) information. By comparing a determined verification value to a known value, a validation computer can verify that the provided information matches the known information. A verification value can be determined by validation computer to verify a user proof and a user state.

An "accumulated state" can include gathered or collected condition of attributes or status of data. An accumulated state can be output by an accumulator. An accumulated state can be a binding commitment to a set of elements together with short membership and/or non-membership proofs for any element in the set. An accumulated state can be a tuple that includes one or more accumulated state elements. For example, an accumulated state can include a first accumulated state element, a second accumulated state element, and a third accumulated state element. An accumulated state can include a first accumulated state element that is based on the each first user state element (e.g., amount) and each second user state element (e.g., random value) of each user in the verification network. An accumulated state can include a second accumulated state element that is based on each second user state element of each user in the verification network. An accumulated state can include a third accumulated state element that can be the number of user states in the verification network.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

1 Introduction

As blockchains grow in size, validating new transactions becomes more resource intensive. To deal with this, there is a need to discover compact encodings of the (effective) state of a blockchain, an encoding that still allows for efficient proofs of membership and updates. For account-based cryptocurrencies, the state can be represented by a key-value map where keys are the account addresses and values consist of account balance, nonce, etc. Embodiments provide for a new encoding for this state whose size does not grow with the number of accounts, yet proofs of membership are of constant-size. Both the encoding and the proofs may consist of just two group elements (in groups of unknown order like class groups). Verifying and updating proofs can involve a few group exponentiations. Additive updates to account values may also be quite efficient.

The state of an account-based cryptocurrency is a key-value map where keys are the addresses of accounts and values are their attributes (e.g., balance, nonce, etc.). Various embodiments provide an encoding for key-value maps in groups of unknown order with the following four properties. 1) Succinct encoding: encoding consists of just two group elements irrespective of the number of keys. 2) Succinct proofs and fast verification: a proof to show that a certain key, value pair is in the encoding consists of just two group elements too. Only three exponentiations may be required to verify a proof. 3) Fast updates to encoding: additive updates to values in the encoding are fast too. 4) Trustless set-up: if class groups are used as the underlying group here, then the encoding scheme could be bootstrapped in a trustless manner.

Figure 3:
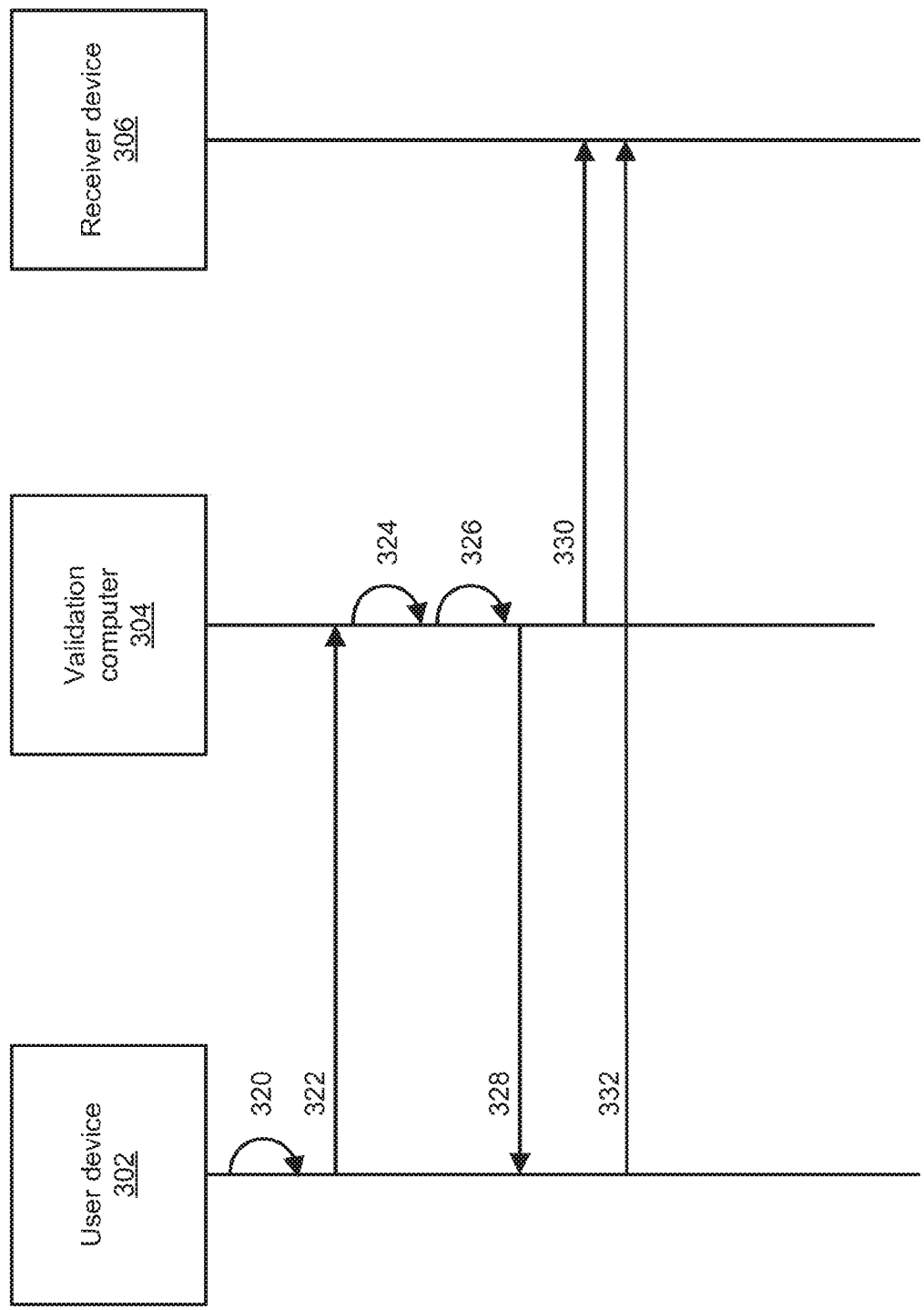
FIG. 3 shows a flow diagram of an authorization request process according to embodiments.
Figure 4:
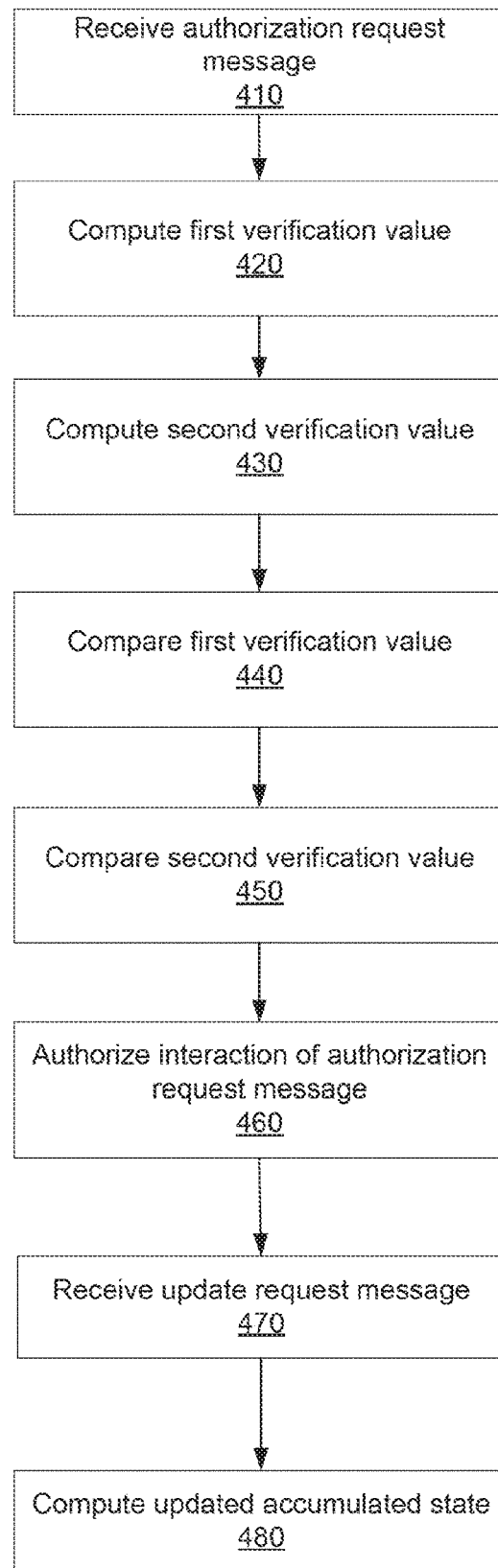
FIG. 4 shows a flow diagram of verification method according to embodiments.

When the encoding scheme is utilized with an account-based cryptocurrency where the updates to values are additive in nature (e.g., for payments), validation becomes an almost stateless task (e.g., two group elements need to be stored). To send an amount b* from an account (k,v) to an account (k',v'), where v consists of balance b≥b*, a user would supply a proof π that (k,v) is part of the encoding. The proof can be verified and the encoding can be easily updated to reflect the new balance values for k, k' . Additionally, other users in the network would update their proofs, which could be done in the same way as updating encodings. An exemplary method is illustrated in FIGS. 3-4 and is described in further detail below.

FIG. 1 shows a system 100 according to various embodiments. The system 100 comprises a user device 110, a validation computer 120, a blockchain network 130, and a receiver device 140. The blockchain network 130 can be a blockchain network that comprises a plurality of computers including additional validation computers, user devices, and receiver devices (not shown). The user device 110 can be in operative communication with the blockchain network 130 and the validation computer 120. The validation computer 120 can be in operative communication with the blockchain network 130 and the receiver device 140. The receiver device 140 can be in operative communication with the blockchain network 130.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the components in system 100 of FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may reside between the devices may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 110 can include any suitable device operated by a user. For example, the user device 110 can include a laptop computer, a desktop computer, a smartphone, etc. The user device 110 may be a computer of a first user that is attempting to initiate a transaction with a second user. The second user may operate, for example, the receiver device 140. The user device 110 may be connected to the blockchain network 130. The user device 110 can generate and provide an authorization request message for an interaction to the validation computer 120. The interaction can be a transaction between the first user of the user device 110 and the second user of the receiver device 140. The authorization request message can include a user state and a user proof that are associated with the user. The authorization request message can also include interaction data, for example, an interaction amount. The interaction data can also include an information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information.

The validation computer 120 may be a computer that authorizes interactions before they are posted on the blockchain network 130. Validation computer 120 may validate blocks before they are added to the blockchain network 130. For example, the validation computer 120 can receive an authorization request message from the user device 110 that requests authorization of an interaction. The validation computer 120 can verify that the user has an amount sufficient for the interaction amount of the interaction, as described in further detail in FIG. 4. For example, the user may have an account with an amount of currency. The validation computer 120 can validate the user has sufficient currency to perform the interaction.

The blockchain network 130 may be a blockchain of a cryptocurrency. In some embodiments, the cryptocurrency of blockchain network 130 may be an account based cryptocurrency. The blockchain network 130 can be a verification network that includes a set of computers programmed to provide verification for an interaction. The blockchain network 130 can add or remove computers from the blockchain network 130 on a continuous basis. The devices of the blockchain network 130 can maintain a blockchain comprising one or more blocks. Each block of the blockchain can include interaction data from processed interactions.

The receiver device 140 may be a computer of a second user that participating in a transaction with the first user. The receiver device 140 may be connected to the blockchain network 130. The receiver device 140 can be a user device that is operated by a different user than the user of the user device 110. For example, the receiver device 140 can be a laptop computer, a desktop computer, a smartphone, etc.

Figure 2A:
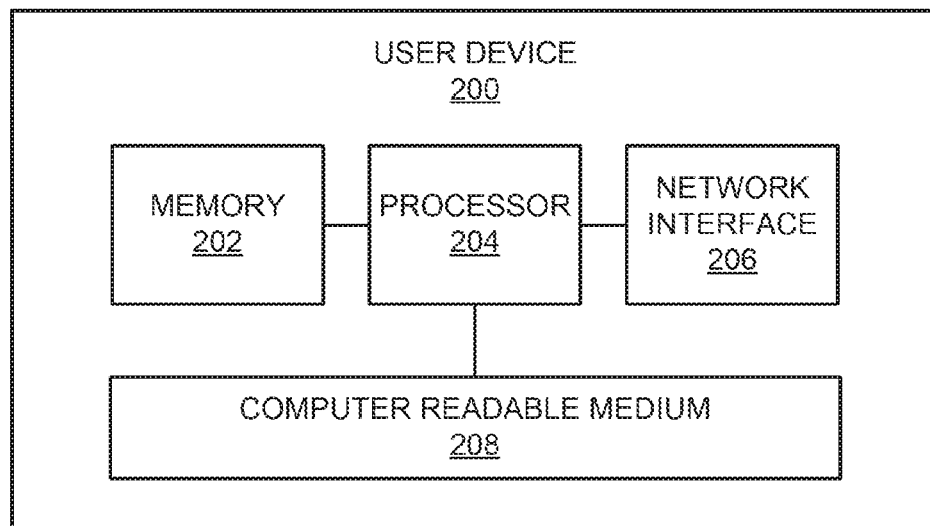
FIG. 2A shows a block diagram of a user device according to embodiments.

FIG. 2A shows a block diagram of a user device 200 according to embodiments. The exemplary user device 200 may comprise a processor 204. The processor 204 may be coupled to a memory 202, a network interface 206, and a computer readable medium 208.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store a user state, a user proof, etc.

The computer readable medium 208 may comprise code, executable by the processor 204, for performing a method comprising: generating, by a user device, an authorization request message comprising a user state and a user proof, wherein the user state comprises a first user state element and a second user state element, and wherein the user proof comprises a first user proof element, a second user proof element, and a third user proof element; providing, by the user device, the authorization request message to a validation computer of a plurality of validation computers, wherein the validation computer 1) computes a first verification value by multiplying the first user proof element raised to the power of the second user state element, and the second user proof element raised to the power of the first user state element, 2) computes the second verification value by raising the second user proof element to the power of the second user state element, 3) compares the first verification value to a first accumulated state element of an accumulated state, 4) compares the second verification value to a second accumulated state element of the accumulated state, and 5) authorizes the authorization request message if the first verification value matches the first accumulated state and the second verification value matches the second accumulated state element; and receiving, by the user device, an authorization response message from the validation computer, wherein the authorization response message indicates whether or not the authorization request message was authorized.

The network interface 206 may include an interface that can allow the user device 200 to communicate with external computers. The network interface 206 may enable the user device 200 to communicate data to and from another device (e.g., a validation computer 250, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 2B:
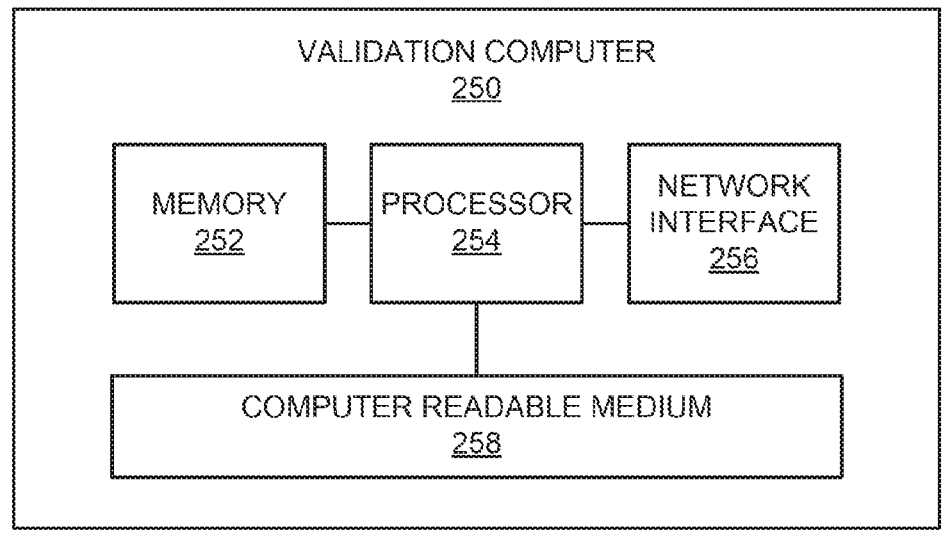
FIG. 2B shows a block diagram of a validation computer according to embodiments.

FIG. 2B shows a block diagram of a validation computer 250 according to embodiments. The exemplary validation computer 250 may comprise a processor 254. The processor 254 may be coupled to a memory 252, a network interface 256, and a computer readable medium 258.

The memory 252 can be used to store data and code. The memory 252 may be coupled to the processor 254 internally or externally (e.g., cloud based data storage), and may comprise any combination of volatile and/or non-volatile memory, such as RAM, DRAM, ROM, flash, or any other suitable memory device. For example, the memory 252 can store blocks of a blockchain, block headers, accumulated states, etc.

The computer readable medium 258 may comprise code, executable by the processor 254, for performing a method comprising: receiving, by a validation computer, an authorization request message from a user device, wherein the authorization request message comprises a user state and a user proof, wherein the user state comprises a first user state element and a second user state element, and wherein the user proof comprises a first user proof element, a second user proof element, and a third user proof element; computing, by the validation computer, a first verification value by multiplying the first user proof element raised to the power of the second user state element, and the second user proof element raised to the power of the first user state element; computing, by the validation computer, a second verification value by raising the second user proof element to the power of the second user state element; comparing, by the validation computer, the first verification value to a first accumulated state element of an accumulated state; comparing, by the validation computer, the second verification value to a second accumulated state element of the accumulated state; and authorizing, by the validation computer, the authorization request message if the first verification value matches the first accumulated state and the second verification value matches the second accumulated state element.

The network interface 256 is similar to the network interface 206 and description thereof will not be repeated here.

2 Concepts

2.1 Notation

For $n \in N$, let $[n]=\{1,2,\ldots,n\}$. Let $\lambda \in N$ denote the security parameter. In some embodiments here, symbols in boldface such as a denote vectors, however, the variables described herein are not limited to either being a vector or a scalar in view of the boldface symbol. The i-th element of the vector a is denoted by $a_i$. A vector a of length $n \in N$ and an index set $I \subseteq [n]$ is denoted by $a_I$, the set of elements $\{a_i\}_{i \in I}$. Any function which is bounded by a polynomial in its argument is denoted by $(\cdot)$. An algorithm T can be said to be PPT if it is modeled as a probabilistic Turing machine that runs in time polynomial in $\lambda$. In some cases a function can be referred to as negligible, denoted by negl, if the function vanishes faster than the inverse of any polynomial. If S is a set, then $$x \xleftarrow{\$} S$$

indicates the process of selecting x uniformly at random over S (which in particular assumes that S can be sampled efficiently). Similarly, $$x \xleftarrow{\$} A(\cdot)$$

denotes the random variable that is the output of a randomized algorithm A.

2.2 Accumulators

A definition of accumulators from [BBF18] can be adapted herein, which follows the conventions of [BCD+17]. For example, a cryptographic accumulator can be a primitive that produces a short binding commitment to a set of elements together with short membership and/or non-membership proofs for any element in the set. These proofs can be publicly verified against the commitment. An accumulator (e.g., a trapdoorless universal accumulator) can be defined as [BBF18] Acc as a primitive that can be formally defined via the following algorithms.

1) Acc.Setup($1^\lambda$): Given the security parameter $\lambda$, the setup algorithm outputs some public parameters pp (which implicitly define the message space M) and an initial state of the accumulator $A_0$.

2) Acc.Add$_{pp}$($A_t$,x): On input the accumulated value $A_t$ at a certain time instant t that corresponds to a set $S_t$ and a message x∈M, the adding algorithm outputs an updated accumulator value $A_{t+1}$ that corresponds to the set $S_{t+1}$= $S_t \cup \{x\}$ and some update information upmsg$_{t+1}$ that may be used to update proofs of other elements.

3) Acc.Del$_{pp}$($A_t$,x): On input the accumulated value $A_t$ at a certain time instant t that corresponds to a set $S_t$ and a message x∈M, the adding algorithm outputs an updated accumulator value $A_{t+1}$ that corresponds to the set $S_{t+1}=S_t\setminus\{x\}$ and some update information upmsg$_{t+1}$ that may be used to update proofs of other elements.

4) Acc.MemWitCreate$_{pp}$($A_t$,x): On input the accumulated value $A_t$ at a certain time instant t that corresponds to a set $S_t$ and a message x∈M, the membership witness creation algorithm outputs a membership proof $w_x^t$ for the membership of x∈$S_t$.

5) Acc.NonMemWitCreate$_{pp}$($A_t$,x): On input the accumulated value $A_t$ at a certain time instant t that corresponds to a set $S_t$ and a message x∈M, the membership witness creation algorithm outputs a non-membership proof $u_x^t$ for the non-membership of x∉$S_t$.

6) Acc.MemWitUp$_{pp}$($A_t$,x,$w_x^t$,upmsg$_{t+1}$): On input the accumulated value $A_t$ at a certain time instant t that corresponds to a set $S_t$, a message x∈M, a membership proof $w_x^t$ for the membership of x∈$S_t$ and the update information upmsg$_{t+1}$ obtained on performing the (t+1)-th update (an Add or Del), the membership witness updating algorithm outputs an updated membership proof $w_x^{t+1}$ for the membership of x∈$S_{t+1}$.

7) Acc.NonMemWitUp$_{pp}$($A_t$,x,$u_x^t$,upmsg$_{t+1}$): On input the accumulated value $A_t$ at a certain time instant t that corresponds to a set $S_t$, a message x∈M, a non-membership proof $u_x^t$ for the non-membership of x∉$S_t$ and the update information upmsg$_{t+1}$ obtained on performing the (t+1)-th update (an Add or Del), the non-membership witness updating algorithm outputs an updated non-membership proof $u_x^{t+1}$ for the non-membership of x∉$S_{t+1}$.

8) Acc.VerMem$_{pp}$($A_t$,x,$w_x^t$): On input the accumulated value $A_t$ at a certain time instant t that corresponds to a set $S_t$, a message x∈M and a membership proof $w_x^t$ for the membership of x∈$S_t$, the membership verification algorithm accepts (i.e., it outputs 1) only if $w_x^t$ is a valid proof of the membership of x∈$S_t$.

9) Acc.VerNonMem$_{pp}$($A_t$,x,$u_x^t$): On input the accumulated value $A_t$ at a certain time instant t that corresponds to a set $S_t$, a message x∈M and a non-membership proof $u_x^t$ for the non-membership of x∉$S_t$, the non-membership verification algorithm accepts (i.e., it outputs 1) only if $u_x^t$ is a valid proof of the non-membership of x∉$S_t$.

For correctness, for all $\lambda$∈N, for all honestly generated parameters $$pp \xleftarrow{\$} Acc.Setup(1^\lambda),$$

for all time instants t∈N∪{0}, for all x∈M, if $A_t$ is the accumulated value at a certain time instant t corresponding to the a set $S_t$ of elements from M (obtained by running a sequence of Acc.Add$_{pp}$ and Acc.Del$_{pp}$), $w_x^t$ is a proof for the membership of x∈$S_t$ generated by Acc.MemWitCreate$_{pp}$ or Acc.MemWitUp$_{pp}$, then Acc.VerMem$_{pp}$($A_t$,x,$w_x^t$) outputs 1 with overwhelming probability. Similarly, if $u_x^t$ is a proof for the non-membership of x∉$S_t$ generated by Acc.NonMemWitCreate$_{pp}$ or Acc.NonMemWitUp$_{pp}$, then Acc.VerNonMem$_{pp}$($A_t$,x,$u_x^t$) outputs 1 with overwhelming probability.

A security definition followed herein [Lip12] formulates an undeniability property for accumulators. The following definition states that an accumulator is secure if an adversary cannot construct an accumulator, an element x, a valid membership witness $w_x$ and a non-membership witness $u_x$ where $w_x$ shows that x is in the accumulator and $u_x$ shows that it is not. This definition is provided as Definition 1: An accumulator Acc is secure if for every PPT adversary A, the following probability is at most negligible in $\lambda$:

$$Pr\begin{bmatrix} (pp, A_0) \xleftarrow{\$} Acc.Setup(1^\lambda) \\ (A, x, w_x u_x) \xleftarrow{\$} A(pp, A_0) \\ Acc.VerMem_{pp}(A, x, w_x) = 1 \wedge Acc.VerNonMem_{pp}(A, x, u_x) = 1 \end{bmatrix}$$

An accumulator can be concise in the sense that the size of the accumulated value $A_t$ and the outputs of all the algorithms above are independent of t.

Accumulators can also be considered to be hiding. For example, an accumulator is hiding if an adversary cannot distinguish whether an element is in the accumulator or not even after obtaining membership and/or non-membership proofs for other elements. A notion of weak hiding can also be defined where given an accumulated value A to a set S, it is hard to recover any x∈S in the worst case. Hiding, in some embodiments, however may not be a critical property in the realization of accumulators. Any construction of accumulators which does not satisfy hiding can be fixed, for example, by using a commitment scheme (e.g., first commit to each message separately using a standard commitment scheme and then apply the accumulator to the obtained set of commitments).

The definition only asks for a sequential update of the proofs of membership and non-membership. In other words, if one applies m updates, proofs of membership and non-membership have to be updated m times. One could hope to build an accumulator scheme where the number of times one has to update proofs of membership and non-membership grows sub-linearly with m, possibly even a constant. [CH10] prove a result to the contrary, but as further discussed herein, this is indeed not ruled out.

2.3 Vector Commitments

A definition of vector commitments is provided in [CF13]. For example, a vector commitment allows a device, a computer, etc. to commit to an ordered sequence of values in such a way that it is later possible to open the commitment only with respect to a specific position. A vector commitment VC can be a non-interactive primitive, that can be formally described via the following algorithms.

1) VC.KeyGen($1^\lambda$,q): Given the security parameter $\lambda$ and the size q of the committed vector (with q=poly($\lambda$)), the key generation algorithm outputs some public parameters pp (which implicitly define the message space M).

2) VC.Com$_{pp}$($x_1$, ..., $x_q$): On input a sequence of q messages $x_1$, ..., $x_q \in$ M and the public parameters pp, the committing algorithm outputs a commitment string C and auxiliary information aux.

3) VC.Open$_{pp}$(x,i,aux): This algorithm is run by the committer to produce a proof $\Lambda_i$ that x is the i-th committed message. In particular, notice that in the case when some updates have occurred, the auxiliary information aux can include the update information produced by these updates.

4) VC.Ver$_{pp}$(C,x,i,$\Lambda_i$): The verification algorithm accepts (i.e., it outputs 1) only if $\Lambda_i$ is a valid proof that C was created to a sequence $x_1$, ..., $x_q$ such that x=$x_i$.

5) VC.Update$_{pp}$(C,x,x',i): This algorithm is run by the committer who produced C and wants to update it by changing the i-th message to x'. The algorithm takes as input the old message x, the new message x' and the position i. It outputs a new commitment C' together with some update information U.

6) VC.ProofUpdate$_{pp}$(C,$\Lambda_j$,x',i,U): This algorithm can be run by any user who holds a proof $\Lambda_j$ for some message at position j with respect to C, and it allows the user to compute an updated proof $\Lambda_j'$ (and the updated commitment C') such that $\Lambda_j'$ will be valid with respect to C' which contains x' as the new message at position i. Basically, the value U contains the update information which is needed to compute such values.

For correctness, for all $\lambda \in$ N, q=($\lambda$), for all honestly generated parameters ppVC.KeyGen($1^\lambda$,q), if C is a commitment on a vector ($x_1$, ..., $x_q$) $\in M^q$ (obtained by running VC.Com$_{pp}$ possibly followed by a sequence of updates), $\Lambda_i$ is a proof for position i generated by VC.Open$_{pp}$ or VC.ProofUpdate$_{pp}$ for any i$\in$[q], then VC.Ver$_{pp}$(C,$x_i$,i,$\Lambda_i$) outputs 1 with overwhelming probability.

The security requirement for vector commitments is that of position binding. For example, this says that it should be infeasible for any polynomially bounded adversary having the knowledge of pp to come up with a commitment C and two different valid openings for the same position i. This definition is provided as Definition 2: A vector commitment VC satisfies position binding if for all i$\in$[q] and for every PPT adversary $\mathcal{A}$, the following probability (which is taken over all honestly generated parameters) is at most negligible in $\lambda$:

$$Pr\left[\begin{array}{l} VC.Ver_{pp}(C, x, i, \Lambda) = 1 \land \\ VC.Ver_{pp}(C, x', i, \Lambda') = 1 \land \\ x \neq x' \end{array} \middle| (C, x, x', i, \Lambda, \Lambda') \leftarrow \mathcal{A}(pp) \right]$$

A vector commitment can be concise in the sense that the size of the commitment string C and the outputs of all the algorithms above are independent of q.

Vector commitments can also be considered to be hiding. For example, a vector commitment is hiding if an adversary cannot distinguish whether a commitment was created to a sequence ($x_1$, ..., $x_q$) or to ($x_1'$, ..., $x_q'$) even after seeing some openings (at positions i where the two sequences agree). A notion of weak hiding can be defined, where given a commitment to a sequence ($x_1$, ..., $x_q$), it is hard to recover any $m_i$ in the worst case. Hiding may not be a critical property in the realization of vector commitments. Any construction of vector commitments which does not satisfy hiding can be fixed using a commitment scheme (e.g., first commit to each message separately using a standard commitment scheme and then apply the vector commitment to the obtained sequence of commitments).

3 Impossibility Results for Accumulators

In this section, a few impossibility results regarding certain desiderata embodiments may have for an accumulator are discussed. In this section, the public key setting will be discussed, unless stated otherwise. However, embodiments are not limited thereto. An accumulator scheme as described herein can be defined as Definition 6, Definition 7, and Definition 8. Definition 6 can be defined as: let k be the security parameter. An accumulator scheme A $\infty$ consists of the following seven algorithms.

1) Setup($1^\lambda$): a probabilistic algorithm that takes the security parameter $\lambda$ in unary as argument and returns a pair of public and private key (PK,SK) as well as the initial accumulated value for the empty set Acc$_\varnothing$.

2) Eval(X,Acc$_\varnothing$,PK,[SK]): given a finite set of elements X, a public key (or the private secret key), and the initial accumulated value Acc$_\varnothing$, the algorithm returns the accumulated value Acc$_X$ corresponding to the set X.

3) Verify(x,w,Acc,PK): given an element x, a witness w, an accumulated value Acc and a public key PK, this deterministic algorithm returns OK if the verification is successful, meaning that x$\in$X, or $\perp$ otherwise.

4) Witness(x,Acc,PK,[SK]): this algorithm returns a witness w associated to the element x of the set represented by Acc.

5) Insert(x,Acc$_X$,PK,[SK]): this algorithm computes the new accumulated Acc$_X$,$Acc_{X \cup \{x\}}$ $_{\{x\}}$ value obtained after the insertion of x into the set X.

6) Delete(x,Acc$_X$,PK,[SK]): this algorithm computes the new accumulated value Acc$_{X\setminus\{x\}}$ obtained from removing x from the accumulated set X.

7) UpdWit(x,w,Acc$_X$,Upd$_{X,X'}$,PK): this algorithm, recomputes the witnesses for some element of x that remains in the set. It takes as parameters the element x whose witness can be updated, the "old" witness w with respect to previous set X represented by the accumulated value Acc$_X$, some update information Upd$_{X,X'}$ and the public key PK, and returns a new witness for x. In some embodiments, this algorithm is run by the user.

Definition 7 can be defined as: let X be a set, Acc$_X$ its associated accumulated value and x$\in$X. An accumulator scheme is correct if Verify(x,w,Acc$_X$,PK)=OK where Acc$_X$ is the accumulated value of the set X, x$\in$X,PK is the public key and w is the witness obtained by running Witness on Acc$_{X,X}$ and PK.

Definition 8 can be defined as: let A $\infty$ be an accumulator scheme. Embodiments can consider a notion of security denoted UF-ACC described by the following experiment: given an integer, k, the security parameter, the adversary has access an oracle O that replies to queries by playing the role of the accumulator manager. Using the oracle, the adversary can insert and delete a polynomial number of elements of his choice. The oracle replies with the new accumulated value. The adversary can also ask for witness computations or updates. Finally, the adversary is required to output a pair (x,w). The advantage of the adversary A is defined by:

$$Adv_{Acc}^{UF-ACC}(A) = \Pr[\text{Verify}(x,w,Acc,PK) = 1 \wedge x \notin X]$$

where PK is the public key generated by Setup.

Consider the following trivial accumulator $A\mathcal{CC}_{duh}$. Let $\lambda$ be the security parameter. $A\mathcal{CC}_{duh}$ consists of the following seven algorithms.

1) Setup($1^\lambda$): the pair of public and private key is empty, i.e., (PK,SK)=null and the initial accumulated value for the empty set $Acc_{\emptyset=\emptyset}$.

2) Eval(X,$Acc_\emptyset$,PK,[SK]): the algorithm returns the accumulated value $Acc_X = X$.

3) Verify(x,w,Acc,PK): this deterministic algorithm checks if x∈ Acc and returns OK if it is and ⊥ otherwise. In some cases, if the witness w is not used in the verification w could be null.

4) Witness(x,Acc,PK,[SK]): this algorithm returns null.

5) Insert(x,$Acc_X$,PK,[SK]): this algorithm computes the new accumulated value $$Acc_X Acc_{X \cup \{x\}} \{x\} = Acc_X \cup \{x\}$$

6) Delete(x,$Acc_X$,PK,[SK]): this algorithm computes the new accumulated value $$Acc_{X\setminus\{x\}} = Acc_X \setminus \{x\}$$

7) UpdWit(x,w,$Acc_X$,$Upd_{X,X'}$,PK): this algorithm returns null. In some cases, if the witness w and the update information $Upd_{X,X'}$ are not used in the verification, then they would be null.

Notice that $A\mathcal{CC}_{duh}$ satisfies the notion of correctness described in Definition 1 and the advantage $Adv_{Acc_{duh}}^{UF\ ACC}(A)$ of any adversary A in the security experiment described in Definition 1 is zero. Acc may grow linearly with the number of elements in it. Further, the running time of Verify may also grows linearly with the number of elements in it. Various improvements provide by embodiments, include constant (in fact, zero) sized witnesses and update information. Furthermore, the witnesses do not change with time.

3.1 Non-trivial Witnesses

An accumulator that truly accumulates can have non-trivial witnesses. This is shown in Theorem 2 as follows: Let $A\mathcal{CC}$ be a correct and secure accumulator scheme as per Definitions 1, 1 and 1. If the size of the accumulator Acc does not grow linearly with the number of elements in it, then the witnesses of the elements can be non-trivial, that is, the size of witnesses can be $\Omega(1)$.

As proof of Theorem 2, let the accumulated set at a certain point in time be X⊆[n] for any arbitrary n. Now, a user may obtain witnesses $w_i$ to each element i∈ [n]. Using these witnesses, it is possible to deduce which of the n elements have been added to the accumulator by running the public verification algorithm Verify on each of the witnesses. This procedure also works completely based on the correctness and security of the accumulator. The only information that could have changed from the initial state are the witnesses and the accumulator itself. Since any number of the n elements could have been added and the user can recover this information exactly, $$\sum_{i \in [n]} |w_i| + |Acc| \geq \log 2^n = n$$

Since |Acc|=o(n), $$\sum_{i \in [n]} |w_i| = \Omega(n)$$

which proves the claim, assuming that witnesses are uniform in size. In some embodiments, to remove this assumption, the size of a witness could be made to be appropriately large.

Note that the above impossibility holds even in the case of insert-only accumulators. Furthermore, even if embodiments were to assume the requirement of some secret key SK in the generation of witnesses and/or scenarios where the witness is generated at the time of insert and can be updated for further use, the proof above would still show that functional (potentially updated) witnesses would have to be non-trivial as long as the accumulator is non-trivial. Thus, one cannot hope to have trivial witnesses in any meaningful setting.

It is easy to see how to realize an accumulator from a vector commitment that has no a priori bound on the size of the vector that will be committed. Thus, the impossibility result holds for such vector commitments as well. The result also holds for vector commitments that have an a priori bound on the size of the vector that will be committed, provided the vector commitment is concise in comparison to the bound.

The impossibility result can be interpreted in the following way. The witness generation algorithm Witness does generate some non-trivial information on every run. Note that the only new information that is available to the algorithm is the elements that are inserted into the accumulator. As defined in [CH10], the inputs to Witness are (x,Acc,PK,[SK]). Since various embodiments may want Acc and PK to be small (in other words, not grow with the number of elements inserted into the accumulator) it is unclear where this non-trivial information comes from. One has to assume that it comes from SK which implies that the definition of [CH10] does not really make sense in the public key setting. In [CH13], in the context of vector commitments, the definition works around this by giving the witness generation algorithm access to some auxiliary information aux that turns out to be the list of messages that have been committed. In [BBF18], in the context of accumulators and vector commitments, the definition works around this by giving the witness generation algorithm the set of messages that have been inserted into the accumulator or vector commitment.

3.2 Batching Updates

Camacho and Hevia [CH10] state that if an accumulator admits updates (e.g., in the form of deletions) then the information needed to update the witnesses after the updates cannot be short, in particular, it cannot be constant sized. In other words, they state that the update information for different updates cannot be batched. This section provides a discussion of their impossibility result. Theorem 3, from [CH10], states: for an update involving m delete operations in a set of n elements, the size of the information $Upd_{X,X'}$ used by the algorithm UpdWit while keeping the dynamic accumulator secure is $$\Omega\left(m \log \frac{n}{m}\right).$$

In particular, if $$m = \frac{n}{2}$$

with n even, then $|Upd_{X,X'}|=\Omega(m)$.

The proof of theorem as presented in [CH10] proceeds as follows. Let the accumulated set at a certain point in time be $X=\{x_1, \ldots, x_n\}$. Suppose a single user possesses the witnesses to each of these elements. An update deleting $1 \leq m \leq n$ elements from X is issued, i.e., $X' \subset X$ with $|X'|=n-m$. Let $Upd_{X,X'}$ be the update information using which the user can update the witnesses for each of the elements in X. Clearly, m of the updated witnesses will be invalid as the corresponding element have been deleted. Furthermore, it is possible to deduce which m of the n elements have been deleted by running the public verification algorithm Verify on each of the updated witnesses. This procedure also works completely based on the correctness and security of the accumulator. Since any m of the n elements could have been deleted and the user can recover this information exactly, $$|Upd_{X,X'}| \geq \log\binom{n}{m} \geq m\log\frac{n}{m}$$

Notice that $Acc_{duh}$ trivially satisfies the notion of correctness described in Definition 7 and the advantage $Adv_{Acc_{duh}}^{\text{UF-ACC}}$ (A) of any adversary A in the security experiment described in Definition 8 is zero. However, regardless of what the update is, the update information $Upd_{X,X'}$ is null. In fact, no witnesses are required for verification and hence in particular, they need not be updated.

An objection to the use of $Acc_{duh}$ in contradicting Theorem 3 is that it isn't really an accumulator in the sense that it does not compress the elements of the set accumulated in any way. The user referenced in the proof who deduces which m of the n elements in the set were deleted does so with more than just the update information $Upd_{X,X'}$. In fact, they need the set $X=\{x_1, \ldots, x_n\}$, the witnesses $\{w_i\}_{i \in [n]}$ of each of n elements, $Acc_X$, $Acc_{X'}$, $Upd_{X,X'}$ and PK. It is all these elements together that inform the user of the elements that were deleted in the update, thus concluding that:

$$\sum_{i \in [n]} |x_i| + \sum_{i \in [n]} |w_i| + |Acc_X| + |Acc_{X'}| + |Upd_{X,X'}| + |PK| m\log\frac{n}{m}$$

One can see that this is certainly true even for $Acc_{duh}$. But notice that $$\sum_{i \in [n]} |x_i| \geq n$$

Thus, this result has no particular consequence and there is hence no reason that a correct and secure accumulator cannot have batched updates.

A more carefully chosen argument on the other hand will imply that $$|Acc_{X'}| + |Upd_{X,X'}| \geq m\log\frac{n}{m}$$

The impossibility of batching updates holds if it is assumed that the accumulator is non-trivial. This is provided in Theorem 4, which states: let A $\propto$ be a correct and secure accumulator scheme as per Definitions 6, 7 and 8. If the size of the accumulator Acc does not grow linearly with the number of elements in it, then the updates to the witnesses of the elements can be non-trivial, that is, the size of the update information per update can be $\Omega(1)$.

As proof of Theorem 4, consider an empty accumulator $Acc_\varnothing$. A series of n updates of the form $upd_i=(\text{Insert},i)$ for $i \in [n]$ can be issued, where n is arbitrary. Let $Upd_{X_{i-1},X_i}$ be the update information that is released as a result of the ith update, where $X_0=\varnothing$ and $X_i=[i]$ for $i \in [n]$. Let $w_i^t$ denote the witness of i with respect to the set $X_t$ for $0 \leq t \leq n$. For every $i \in [n]$, $w_i^0$ can be computed using just $Acc_\varnothing$ and PK. Note that all the final witnesses, that is, $w_i^n$ for every $i \in [n]$ are computed using just the update information $upd_i$ for $i \in [n]$. Using these updated witnesses, it is possible to deduce which of the n elements have been added to the accumulator by running the public verification algorithm Verify on each of the witnesses. This procedure also works completely based on the correctness and security of the accumulator. The only new information that could have been obtained as compared to the initial state are the update information and the accumulator itself. Since any number of the n elements could have been added and the user can recover this information exactly, $$\sum_{i \in [n]} |upd_i| + |Acc| \geq \log 2^n = n$$

Since $|Acc|=o(n)$, $$\sum_{i \in [n]} |upd_i| = \Omega(n)$$

which proves the claim, assuming that update information per update is of a uniform size. In some embodiments, to remove this assumption, the size of the update information could be made to be appropriately large.

Note that the above impossibility holds even in the case of insert-only accumulators. Furthermore, even if it is assumed that the requirement of some secret key SK in the generation of witnesses and update information and/or scenarios considered herein where the witness and update information is generated at the time of insert and can be updated for further use, the proof above would still show that any functional (potentially updated) update information would have to be non-trivial as long as the accumulator is non-trivial. Thus, one cannot hope to batch updates to witnesses in any meaningful setting.

It is easy to see how to realize an accumulator from a vector commitment that has no a priori bound on the size of the vector that will be committed. Thus, the impossibility result trivially holds for such vector commitments as well. The result also holds for vector commitments that have an a priori bound on the size of the vector that will be committed, provided the vector commitment is concise in comparison to the bound.

The impossibility result can be interpreted in the following way. The witnesses can depend on the set of elements in the accumulator at given time. In this sense, it is clear that updates cannot be batched as the updates can convey information about the elements that have been inserted or deleted from the accumulator so that the updated witnesses also reflect the current set of elements in the accumulator.

4 Accumulators

In this section an accumulator scheme is described. As a starting point, consider an accumulator which satisfies all the requirements, but for being concise, as described by the following functions:

1) Setup($1^\lambda$): Sample the description of a hash function H that maps $\lambda$-bit numbers to unique O($\lambda$)-bit primes. Set M=$\{0,1\}^{80}$. Output (pp,$A_0$)=(H,1).

2) Add$_{pp}$($A_t$,x): Check whether H(x)|$A_t$. If so, set $A_{t+1}$32 $A_t$. Otherwise set $A_{t+1}$=$A_t$·H(x). Output ($A_{t+1}$,upmsg$_{t+1}$=null).

3) Del$_{pp}$($A_t$,x): Check whether H(x)|$A_t$. If so, set $$A_{t+1} = \frac{A_t}{H(X)}.$$

Otherwise set $A_{t+1}$=$A_t$. Output ($A_{t+1}$,upmsg$_{t+1}$=null).

4) MemWitCreate$_{pp}$($A_t$,x): Output $w_x^t$ 32 null.

5) NonMemWitCreate$_{pp}$($A_t$,x): Output $u_x^t$=null.

6) MemWitUp$_{pp}$($A_t$,x,$w_x^t$,upmsg$_{t+1}$): Output $w_x^{t+1}$=null.

7) NonMemWitUp$_{pp}$($A_t$,x,$u_x^t$,upmsg$_{t+1}$): Output $u_x^{t+1}$=null.

8) VerMem$_{pp}$($A_t$,x,$w_x^t$): Check whether H(x)|$A_t$. If so, output 1. Otherwise, output $\perp$.

9) VerNonMem$_{pp}$($A_t$,x,$u_x^t$): Check whether H(x)|$A_t$. If so, output $\perp$. Otherwise, output 1.

The accumulator described above satisfies correctness and security requirements. An issue is that in the worst case, |$A_t$|=O(80 t). In some embodiments, a way to solve this technical problem is to put this product accumulator in the exponent, i.e., construct an accumulator of the form $$A_t = g^{\prod_{x \in S_t} H(x)}$$

where g is the generator of a group G. This is similar to the starting point of the construction in [BBF18]. However, the issue now is that instead of actually working with $\prod_{x \in S_t} H(x)$, embodiments work with $\prod_{x \in S_t} H(x)$ modulo the order of the group G and for soundness, embodiments can rely on the fact that the order of the group is unknown. In fact, [BBF18] prove security of the accumulator based on the Strong RSA assumption. In this scenario, however, one has to start releasing witnesses as opposed to the case of the trivial construction. The witnesses in [CF13] and [BBF18] are, in some form, an "accumulator" of all the other elements in the accumulator. Thus, may need to be updated as the accumulator changes. For these reasons, scenarios where MemWitCreate($A_t$,x) is executed as a part of Add$_{pp}$($\lambda_{t-1}$,x) and the witness is only updated going forward are considered, as opposed to being able to generate a witness for any arbitrary element at an arbitrary time instant. Equipped with these intuitions, systems and methods according to various embodiments will be further described.

4.1 An Insert-only Accumulator

First an insert-only accumulator construction will be discussed. Note that the lower bounds discussed herein apply in this case as well. Witnesses for non-membership of elements can be ignored. The accumulator A to the set X=$\{x_i\}_{i \in [q]}$ (X can refer to a total accumulated amounts of value in the system, $x_{i,l}$ can be an amount held by user i, and q can be the total number accounts), according to embodiments, takes the form as follows and as illustrated in FIG. 5A:

$$A_X = \left(g^{\sum_{i \in [q]} x_i \prod_{j \in [q] \setminus \{i\}} z_j}, g^{\prod_{i \in [q]} z_i}, q\right)$$

where $z_i$ can be a random value associated with user i, and g can be a generator. i and q are described above, and j can refer to users other than i. The accumulator output may be referred to as an accumulated state and may be a tuple comprising a first accumulated state element, a second accumulated state element, and a third accumulated state element, which may respectively correspond to the three elements in the parenthesis in the equation above.

As an illustrative example, there can be three users that are associated with user states. The accumulated state can accumulate the user state of the first user, the user state of the second user, and the user state of the third user. The accumulated state can be stored in the most recent block of the blockchain. In some embodiments, the accumulated state can be stored in the block header of the most recent block of the blockchain. For example, the accumulated state, when there are three accumulated user states, can be equal to ($g^{x_1 z_2 z_3 + x_2 z_3 z_1 + x_3 z_2 z_1}, g^{z_2 z_3 z_1}, 3$). Here, $x_1$ can refer to an amount with of a first user, user 1. $z_2$ and $z_3$ may be random values associated with second and third users (user 2 and user 3), respectively.

The first accumulated state element can be created based on each first user state element (e.g., amount) and each second user state element (e.g., random value) of each user in the verification network. The first user state element can be generated by raising each first user state element to the power of the product of every second user state element other than the second user state element associated with the first user state element. Each of these exponentiations already by to a power of a generator g and can then be multiplied together. For example:

$$(g^{x_1})^{z_2 z_3} \cdot (g^{x_2})^{z_1 z_3} \cdot (g^{x_3})^{z_1 z_2}$$

This equation is equivalent to the first element of the accumulated state tuple illustrated above.

The second accumulated state element can be created based on each second user state element of each user in the verification network. The second accumulated state element can be created by multiplying each second user state element in the exponent of the selected generator value.

The third accumulated state element can be the number of user states in the verification network. For example, the above example would have three different users corresponding to three different user states. Therefore, the third accumulated state element would be a value of 3. However, in some embodiments, a user may be associated with more than one user state. For example, the user may have multiple accounts in the verification network. The third accumulated state element represents the number of user states rather than the number of users in the verification network.

The witness for membership of an element $x_k \in X$ (k denotes an identifier for a user, x would be an amount associated with user k, and X is the total amount of value in the system) would be as follows and as illustrated in FIG. 5B:

$$w_{x_k} = \left(g^{\sum_{i \in [q] \setminus \{k\}} x_i \prod_{j \in [q] \setminus \{i,k\}} z_j}, g^{\prod_{i \in [q] \setminus \{k\}} z_i}, k\right)$$

which is essentially the accumulator of all the other elements in X (the pi symbol above symbolizes a proof and is not a variable in the equation above). The witness may be referred to as a user proof and may be a tuple comprising a first user proof element, a second user proof element, and a third user proof element (respectively corresponding to the elements in parenthesis in the above equation). The element $x_k$ may be part of a user state $(x_k, z_k)$. The elements in the parenthesis in this equation may be examples of a first user state element, and a second user state element, respectively. Assume that the random values $z_i$ can be publicly generated, say by some pseudorandom function. In some embodiments, any real randomness is not required in the $z_i$s, if there is some concise representation of them. This is clear from the fact that various embodiments may publish the key for the pseudorandom function to enable its public evaluation. Then, the verification of the witness $w_{x_k}$ would simply be the following checks, comprising computing a first verification value, as illustrated in FIG. 5C:

$$w_{x_k,1}^{z w_{x_k,3}} \cdot w_{x_k,2}^{x w_{x_k,3}} = \left( g^{\sum_{i \in [q] \setminus \{k\}} x_i \prod_{j \in [q] \setminus \{i,k\}} z_j} \right)^{z_k} \cdot \left( g^{\prod_{i \in [q] \setminus \{k\}} z_i} \right)^{x_k}$$

$$= g^{\sum_{i \in [q] \setminus \{k\}} x_i \prod_{j \in [q] \setminus \{i,k\}} z_j} \cdot g^{x_k \prod_{i \in [q] \setminus \{k\}} z_i}$$

$$= g^{\sum_{i \in [q]} x_i \prod_{j \in [q] \setminus \{i\}} z_j}$$

$$= A_{X,1}$$

and a second verification value, as illustrated in FIG. 5D:

$$w_{x_k,2}^{z w_{x_k,3}} = \left( g^{\prod_{i \in [q] \setminus \{k\}} z_i} \right)^{z_k}$$

$$= g^{\prod_{i \in [q]} z_i}$$

$$= A_{X,2}$$

The computation of and examples of the first and second verification values is described below with respect to FIG. 4.

Note that the above design also describes a procedure to add an element to the accumulator. To add an element $x_{q+1}$ to X, $$A_{X'} = (A_{X,1}^{z_{q+1}} \cdot A_{X,2}^{x_{q+1}}, A_{X,2}^{z_{q+1}}, A_{X,3}+1)$$

where $X' = X \cup \{x_{q+1}\}$. Furthermore, the witness for membership of $x_{q+1}$ can be $w_{x_{q+1}} = A_X$.

The witnesses for membership of elements can also be updated. For instance, on adding $x_{q+1}$ to the accumulator, with the update information $(x_{q+1}, q+1)$, the witness $w_{x_k}$ can be updated for membership of $x_k$ as follows:

$$w_{x_k}' = (w_{x_k,1}^{z_{q+1}} \cdot w_{x_k,2}^{x_{q+1}}, w_{x_k,2}^{z_{q+1}}, w_{x_k,3})$$

One can easily verify that the verification of membership of $x_k \in X'$ would succeed.

The final piece of the puzzle is security, namely, soundness of the verification procedure. Since various embodiments are dealing with an append-only accumulator and not dealing with witnesses for non-membership, the security requirement would be that it is computationally infeasible for an adversary to produce a witness for an element x' that is not in the accumulator. This can be analyzed as follows. Suppose an adversary comes up with an element x and a witness $w = (w_{x,1}, w_{x,2}, w_{x,3})$ for the membership of x. First, check that $1 \leq w_{x,3} \leq A_{X,3}$. Let $w_{x,3} = k$ and $A_{x,3} = q$. Then, check that $$w_{x,2}^{z_k} = A_{X,2}$$

If the check passes, then, with overwhelming probability, $$w_{x,2} = g^{\prod_{i \in [q] \setminus \{k\}} z_i}$$

This is because $$\alpha = \frac{w_{x,2}}{g^{\prod_{i \in [q] \setminus \{k\}} z_i}} \neq \pm 1$$

is a non-trivial $z_k$th root of unity. Such elements can be hard to find without knowing the order of the group. In particular, this means that the order of the non-trivial element $\alpha$ has been computed. As a final check:

$$w_{x,1}^{z_k} \cdot w_{x,2}^{x} = A_{X,1}$$

Note that $$w_{x_k,1}^{z_k} \cdot w_{x_k,2}^{x_k} = A_{X,1}$$

and, with overwhelming probability, $w_{x,2} = w_{x_k,2}$. Hence $$\left( \frac{w_{x,1}}{w_{x_k,1}} \right)^{z_k} = w_{x_k,2}^{x_k - x}$$

For the case where $x_k \neq x$:

$$\beta = \frac{w_{x,1}}{w_{x_k,1}}, \text{ and}$$

$$\gamma = w_{x_k,2}^{x_k - x}$$

thus determining $\beta$, a $z_k$th root of a non-trivial element $\gamma$ which would be hard to find in groups of unknown order. However, the following attack can be possible: set $x_k - x = z_k$ and $w_{x,1} = w_{x_k,1} \cdot w_{x_k,2}$. Then, the verification check would pass. To guard against such attacks, various embodiments can ensure that $x_k - x \neq z_k$. This can be done by having $z_k$ be exponentially (in $\lambda$) larger than $x_k - x$.

FIG. 3 shows a flowchart of an authorization request message processing method according to embodiments. The method illustrated in FIG. 3 will be described in the context of a user device 302 generating an authorization request message for an interaction between the user device 302 and a receiver device 306. The user device 302 can provide the authorization request message to a validation computer 304 and can receive an authorization response message indicating whether or not the interaction is authorized. For example, in some embodiments, an interaction can be a transaction and may be authorized when the validation computer 304 includes the transaction in a block of a blockchain.

Prior to step 320, in some embodiments, the user device 302 can initiate an interaction (e.g., a transaction, a data transfer interaction, etc.). For example, a first user of the user device 302 can select to perform a transaction with a second user of the receiver device 306.

At step 320, the user device 302 can generate an authorization request message for the interaction. The authorization request message can comprise a user state and a user proof. In some embodiments, the authorization request message can further comprise interaction data, a date, a time, a user device identifier, a receiver device identifier, etc. The user state can be a tuple that comprises one or more elements. For example, the user state can comprise a first user state element and a second user state element.

The first user state element can be an amount (e.g., a balance, etc.) associated with an account of the user of the user device 302. For example, a first user state element can be $x_k$, where k denotes an identifier for a user (e.g., user 1 is k=1) and x denotes an amount (e.g., $5.00). In some embodiments, the first user state element can be created based on the amount. For example, the first user state element can be created based concatenating, or otherwise combining, the amount with a nonce.

The second user state element can be can be a random value. For example, a second user state element can be $z_k$, where k denotes an identifier for a user (e.g., user 1 is k=1) and z denotes the random value (e.g., 18389828332). In some embodiments, the second user state element can be an output of a hash function. For example, a value that indicates a particular position in a vector can be input into a hash function to obtain the second user state element. For example, each user can be assigned a particular position in a vector used to create an accumulator commitment. The first user can be assigned the first position in the vector (e.g., a value of 0 or 1). The second user state element for the first user can be equal to the output of a hash function (e.g., H(0) or H(1)).

The user proof, of the authorization request message, can be a tuple that comprises one or more elements. For example, the user proof can comprise a first user proof element, a second user proof element, and a third user proof element. The user proof can be a witness, as described herein. The witness can be a proof of membership of an element in an accumulated state. For example, the user proof can be a proof that the user state is an element in the accumulated state, which may be stored in each block of the blockchain. Stated differently, the user proof can be used by a user to prove that his or her user state is present in the accumulated state. The accumulated state may be an compact aggregation of user states in the blockchain network.

The first user proof element and the second user proof elements can be utilized by a validation computer to verify that the user state is included in the accumulated state of the most recent block in the blockchain. As such, the validation computer 304 can validate that the user device 302 is associated with a sufficient amount (e.g., funds) to perform the interaction (e.g., a transaction).

The third user proof element of the user proof can include a value of the number of elements accumulated so far in the accumulated state. For example, if there 500 accounts associated with 500 users in the blockchain network, then the third user proof element can be a value of 500 to represent the number of accounts.

As an example, the accumulated state can be as follows an as illustrated in FIG. 5A:

$$A_X = \left(g^{\Sigma_{i \in [q]} x_i \Pi_{j \in [q] \setminus (i)} z_j}, g^{\Pi_{i \in [q]} z_i}, q\right).$$

As an example, the user proof can be as follows an as illustrated in FIG. 5B:

$$w_{x_k} = \left(g^{\Sigma_{i \in [q] \setminus (k)} x_i \Pi_{j \in [q] \setminus (i,k)} z_j}, g^{\Pi_{i \in [q] \setminus (k)} z_i}, k\right).$$

These equations are described in detail above.

In some embodiments, prior to generating the authorization request message, the user device 302 can update the user proof based on interactions included in a blockchain since a last time the user proof was updated. For example, the user device 302 can update the user proof using one or more value changes ($\delta_k$, where k is a specific user and the delta symbol represents the change) from each interaction performed since the last time that the user device 302 updated the user proof. For example, the starting user proof can be ($g^{x_2z_3+x_3z_2}, g^{z_2z_3}, 1$). The second user proof element and the third user proof element do not need to be updated. To update the first user proof element with value change $\delta_2$ (e.g., a transaction amount of a transaction conducted by a second user, user 2), the user device 302 can raise the first user proof element (e.g., $g^{x_2z_3+x_3z_2}$) to the exponent of the change in amount $\delta_2$ multiplied by the random value ($Z_2$) associated with the user state that corresponds to the change in amount $\delta_2$. For example, $(g^{x_2z_3+x_3z_2})^{\delta_2 z_2} = g^{(x_2\delta_2)z_3+x_3z_2}$. These can represent the new first user proof element, which incorporates the transaction amount $\delta_2$.

As such, the user device 302 can update the user proof based on the interactions included in the blocks of the blockchain that have been added since the user device 302 last updated the user proof.

At step 322, after generating the authorization request message, the user device 302 can provide the authorization request message to the validation computer 304. In some embodiments, the user device 302 can broadcast the authorization request message to a plurality of validation computers in the verification network, where the validation computer 304 is one of the plurality of validation computers.

At step 324, after receiving the authorization request message, the validation computer 304 can verify the user proof. For example, the validation computer 304 can verify that the user proof provides sufficient proof that an amount of the interaction is equal to or less than an amount indicated by the first user state element. For example, the validation computer 304 can verify that the user has sufficient funds. The validation computer 304 can determine whether or not to include the interaction in a new block of the blockchain. Step 324 is described in further detail in FIG. 4.

At step 324, after evaluating the authorization request message and determining whether or not to include the interaction in the new block of the blockchain, the validation computer 304 can generate an authorization response message comprising an indication of whether or not the interaction is authorized.

At step 328, after generating the authorization response message, the validation computer 304 can provide the authorization response message to the user device 302.

In some embodiments, at step 330, after generating the authorization response message, the validation computer 304 can provide the authorization response message to the receiver device 306 which with the user device 302 is performing the interaction.

In other embodiments, at step 332, after receiving the authorization response message from the validation computer 304, the user device 302 can provide the authorization response message to the receiver device 306.

FIG. 4 shows a flowchart of a verification method according to embodiments. The method illustrated in FIG. 4 will be described in the context of a user device providing an authorization request message to a validation computer. The validation computer can verify that a user of the user device is associated with an amount that is sufficient to perform an interaction. In some embodiments, the validation computer can authorize the interaction based on verification of the user and/or user device. Steps 410-480 of FIG. 4 may be performed during step 324 of FIG. 3. For example, the authorization request message provided from the user device 302 to the validation computer 304 can be the authorization request message received by the validation computer at step 410.

At step 410, the validation computer can receive the authorization request message from a user device. The authorization request message can comprise a user state and a user proof, as described herein. The user state comprises a first user state element and a second user state element. The user proof comprises a first user proof element, a second user proof element, and a third user proof element.

As an illustrative example, the user state can represent information about the user. For example, the user state (e.g., $(x_k, z_k)$) can be a tuple including an amount included in an account associated with the user (e.g., the first user state element $x_k$) and a random value (e.g., the second user state element $z_k$). The values included in the user state can be any suitable numerical values. For example, the first user state element $x_k$ can have a value of $100. The second user state element $z_k$ can have a value of 0, 5, 100, etc. In this example, the user state can be associated with the first user. Therefore, the user state can be written as $(x_1, z_1)$.

The user proof comprising the first user proof element, the second user proof element, and the third user proof element can be a witness for membership of an element $x_k \in X$ (e.g., the first user state element). In some embodiments, the first user proof element and the second user proof element can be data items that may provide proof that the first user state element $x_k$ is included into an accumulated state of the most recent block in a blockchain. The third user proof element can indicate which of a number of entries in the accumulated state the user is associated with (e.g., which of a number of first user state elements from a plurality of users included in the accumulated state is the user associated with).

As an illustrative example, there can be three different first user state elements associated with three different users. If the first user is assigned to amount 1(e.g., of exemplary amounts 1, 2, and 3), then the third user proof element of the first user can be equal to 1 (e.g., k=1). The first user proof element and the second user proof element can be generated based on the user states of the second user and the third user and may not need to be generated based on the user state of the first user. Furthermore, the first user proof element can be generated based on both the amount and the random value of the user states of the second user and the third user. Whereas, the second user proof element can be generated based on the random value of the user states of the second user and the third user. For example, the first user proof element can be ($g^{x_2z_3+x_3z_2}$). The second user proof element can be ($g^{z_2z_3}$). Therefore, the user proof received by the validation computer can be ($g^{x_2z_3+x_3z_2}, g^{z_2z_3}, 1$).

In some embodiments, the authorization request message can also comprise interaction data. For example, the user device can include interaction data related to the interaction into the authorization request message for the interaction that the user device is attempting. For example, the interaction data in the authorization request message can include an interaction amount. In some embodiments, the interaction data can include a transaction amount and unspent transaction outputs (UTXOs). In other embodiments, the interaction data can include information associated with the user device 302 and/or the user (e.g., a token or account information, an alias, a device identifier, a contact address, etc.), information associated with the receiver device 306 and/or the user of the receiver device 306 (e.g., a token or account information, an alias, a device identifier, a contact address, etc.), one-time values (e.g., a random value, a nonce, a timestamp, a counter, etc.), and/or any other suitable information.

At step 420, after receiving the authorization request message, the validation computer can compute a first verification value. The validation computer can determine the first verification value by multiplying the first user proof element raised to the power of the second user state element, and the second user proof element raised to the power of the first user state element. In some embodiments, the first verification value can be utilized to verify the first user proof element, whereas the second verification value can be utilized to verify the second user proof element.

As an example, the validation computer can determine the first verification value by multiplying the first user proof element raised to the power of the second user state element (e.g., $(g^{x_2z_3+x_3z_2})^{z_1}$), and the second user proof element raised to the power of the first user state element (e.g., $(g^{z_2z_3})^{x_1}$). Multiplying these two factors can result in $(g^{x_2z_3+x_3z_2})^{z_1} \cdot (g^{z_2z_3})^{x_1} = g^{x_1z_2z_3+x_2z_3z_1+x_3z_2z_1}$. This term can be characterized as the generator g raised to a power that is based on the amounts and random values of each user in the system.

At step 430, after computing the first verification value, the validation computer can compute the second verification value by raising the second user proof element to the power of the second user state element. As an example, the validation computer can determine the second verification value by raising the second user proof element (e.g., $g^{z_2z_3}$) to the power of the second user state element (e.g., $Z_1$). Performing this exponentiation can result in $(g^{z_2z_3})^{z_1} = g^{z_2z_3z_1}$. This represents the generator raised to a power based on all random numbers, but without the amounts.

In some embodiments, rather than receiving the user state from the user device, the validation computer can obtain the user state from another data source using the user identifier, k. For example, the third user proof element can be equal to 1, which can be an identifier $k_1$ for a first user, user 1. The validation computer can determine that the first user state element and the second user state element that are used in determine the first verification value and the second verification value should be associated with the first user (e.g., $(x_1, z_1)$).

In some embodiments, the validation computer can retrieve an accumulated state comprising the first accumulated state element and the second accumulated state element from a previous block in a blockchain maintained by the validation computer prior to step 440.

At step 440, after determining the first verification value and the second verification value, the validation computer can compare the first verification value to a first accumulated state element of an accumulated state. As described herein, the accumulated state can be the following (which is described in detail above):

$$A_X = (g^{\Sigma_{i \in [q]} x_i \prod_{j \in [q] \setminus \{i\}} z_j}, g^{\prod_{i \in [q]} z_i}, q).$$

In this example, there can be three users that are associated with three user states. The accumulated state can accumulate the user state of the first user, the user state of the second user, and the user state of the third user. The accumulated state can be stored in the most recent block of the blockchain. In some embodiments, the accumulated state can be stored in the block header of the most recent block of the blockchain. For example, the accumulated state, when there are three accumulated user states, can be equal to $(g^{x_1z_2z_3+x_2z_3z_1+x_3z_2z_1}, g^{z_2z_3z_1}, 3)$.

The validation computer can compare the first verification value (determined in step 420) of $g^{x_1z_2z_3+x_2z_3z_1+x_3z_2z_1}$ to the first accumulated state element (e.g., $g^{x_1z_2z_3+x_2z_3z_1+x_3z_2z_1}$) of the accumulated state. In this example, the validation computer determines that the first verification value matches the first accumulated state element stored in the blockchain. The validation computer can then proceed to step 450 to verify the second verification value.

In some embodiments, if the user device is malicious and attempts to provide a user state that, for example, includes a first user state element (e.g., amount) that differs from the actual amount as included in the accumulated sate, then the validation computer will determine that the first verification value does not match the first accumulated state element. For example, if the user device provides a fake amount f (e.g., attempting to perform a transaction for which the user does not actually have the required funds), then the validation computer would determine a first verification value of $g^{fz_2z_3+x_2z_3z_1+x_3z_2z_1}$, which would not match the first accumulated state element of $g^{x_1z_2z_3+x_2z_3z_1+x_3z_2z_1}$ because the fake amount f alters the computation such that the result is not the same as the situation in which the actual amount $x_1$ is used.

At step 450, the validation computer can compare the second verification value to a second accumulated state element of the accumulated state. The validation computer can compare the second verification value (determined in step 430) of $g^{z_2z_3z_1}$ to the first accumulated state element (e.g., $g^{z_2z_3z_1}$) of the accumulated state. In this example, the validation computer determines that the second verification value matches the second accumulated state element stored in the blockchain. The validation computer can then proceed to step 460 to authorize the interaction of the authorization request message.

In some embodiments, if the user device provides a fake amount (e.g., the first user state element), but provides the correct random value (e.g., the second user state element), the validation computer can determine that the first verification value does not match the first accumulated state element, but that the second verification value does match the second accumulated state element. This is because, the second verification value is not dependent upon the fake amount (e.g., the first user state element).

In some embodiments, the validation computer can compare the third user proof element to the third accumulated state element of the accumulated state. For example, the validation computer can determine whether or not the third user proof element is a value less than or equal to the third accumulated state element. The third accumulated state element can be the total number of user states in the verification network. Therefore, if the user device provides a third user proof element that is greater than the third accumulated state element, then the user device is providing incorrect information to the validation computer.

At step 460, if the first verification value matches the first accumulated state and the second verification value matches the second accumulated state element, the validation computer can authorize the interaction of the authorization request message. In some embodiments, the validation computer can also determine if the interaction amount included in the authorization request message is less than or equal to the first user state element (e.g., amount). If the interaction amount is less than or equal to the first user state element, then the user device can determine that the user has sufficient funds for the interaction. If the interaction amount is greater than the first user state element, then the validation computer can deny the interaction.

After authorizing the interaction, the validation computer can include at least the interaction amount into a new block of the blockchain maintained by the validation computer. For example, the validation computer can propose a new block including at least the interaction amount of the interaction and any number of other interactions to the verification network. The verification network can perform any suitable consensus protocol to determine whether or not to add the new block to the blockchain. If the computers of the verification network determine to add the new block to the blockchain, then the validation computer can generate an authorization response message indicating that the authorization request message is authorized. The validation computer can provide the authorization response message to the user device.

In some embodiments, the validation computer can update the accumulator state based on the change in value to the amount (e.g., first user state element) based on the interaction amount. For example, the validation computer can update the accumulator state based on each performed interaction that is included into the new block of the blockchain. If 50 interactions are included in the block, then the validation computer can update the accumulator based on the 50 changes in value (e.g., $\delta_k$).

As an example, the validation computer can update the accumulator state based on the authorized interaction described in reference to FIG. 4. The change in the amount (e.g., first user state element) can be $\delta_1$. Specifically, the validation computer can update the first accumulated state element based on the second user proof element (e.g., $g^{z_2z_3}$) and the change in amount $\delta_1$, which is also equal to the interaction amount.

The validation computer can raise the second user proof element (e.g., $g^{z_2z_3}$) to the exponent of the change in amount $\delta_1$. For example, $(g^{z_2z_3})^{\delta_1} = g^{z_2z_3\delta_1}$. The validation computer can then multiply the above value $g^{z_2z_3\delta_1}$ (e.g., an intermediary value) with the first accumulated state element of $g^{x_1z_2z_3+x_2z_3z_1+x_3z_2z_1}$. For example:

$$g^{x_1z_2z_3+x_2z_3z_1+x_3z_2z_1} \cdot g^{z_2z_3\delta_1} = g^{(x_1+\delta_1)z_2z_3+x_2z_3z_1+x_3z_2z_1}$$

As such, the validation computer may only need to update the accumulated state based on changes in value (e.g., interaction amounts) for first user state elements used in interactions in the new block of the blockchain. The validation computer does not need to recompute the exponents of the accumulated state elements that include user state elements not used in interactions in the new block.

In some embodiments, the user device can locally update the user proof in a similar manner to how the validation computer updates the accumulated state.

4.2 Construction

Next, a construction of the accumulator utilized in various embodiments (e.g., in FIGS. 3-4) is provided. The following 5 functions can be utilized.

1) Setup($1^\lambda$): Sample the description of a group $$G \xleftarrow{\$} GGen(\lambda)$$

of unknown order in the range [a,b] where a, b and a-b are exponential in $\lambda$ and a random element $$g \xleftarrow{\$} G$$

In some embodiments, a random element of G would be a generator of G with overwhelming probability, and at the very least, may not be of low order. Let |b|=m. Sample the description of a hash function H that maps $\lambda$-bit numbers to unique primes from the set Primes(m+1)\[0,b]. Set M=[0,a). Output (pp,$A_0$)=((G,g,H,a,b),(1,g, 0)).

2) $\text{Add}_{pp}(A_t,x)$: Let $z_{t+1}=H(t+1)$.

Set $A_{t+1}=(A_{t,1}^{z_{t+1}} \cdot A_{t,2}^x, A_{t,2}^{z_{t+1}}, A_{t,3}+1)$

Output ($A_{t+1}$,upmsg$_{t+1}$=(x,t+1)).

3) $\text{MemWitCreate}_{pp}(A_t,x)$: On an execution of $\text{Add}_{pp}(A_{t-1},x)$, $\text{MemWitCreate}_{pp}(A_t,x)$ outputs $w_x^t=A_{t-1}$.

4) $\text{MemWitUp}_{pp}(A_t,x,w_x^t,\text{upmsg}_{t+1})$: Parse the inputs $A_t=(A_{t,1},A_{t,2},A_{t,3})$, $w_x^t=(w_{x,1}^t,w_{x,2}^t,w_{x,3}^t)$ and and upmsg$_{t+1}$=(upmsg$_{t+1,1}$,upmsg$_{t+1,2}$). Let z=H(upmsg$_{t+1,2}$). Output $$w_x^{t+1}=((w_{x,1}^t)^z \cdot (w_{x,2}^t)^{upmsg_{t+1,1}},(w_{x,2}^t)^z,w_{x,3}^t)$$

5) $\text{VerMem}_{pp}(A_t,x,w_x^t)$: Parse the inputs $A_t=(A_{t,1},A_{t,2},A_{t,3})$ and $w_x^t=(w_{x,1}^t,w_{x,2}^t,w_{x,3}^t)$. Let $z=H(w_{x,3}^t+1)$. Check whether:

$0 \leq x < a$ $0 \leq w_{x,3}^t < A_{t,3}$ $(w_{x,2}^t)^z = A_{t,2}$ $(w_{x,1}^t)^z \cdot (w_{x,2}^t)^x = A_{t,1}$ If so, output 1. Otherwise, output $\perp$.

4.3 Completeness and Efficiency

The correctness of the scheme follows directly from inspection. Also note that each can operation involve, at the most, one hash computation, three exponentiations and one multiplication in terms of computational difficulty. The size of the accumulator can be constant, namely, two group elements, aside from a counter that keeps track of the number of elements that have been added to the accumulator, which grows logarithmically. Assuming that not more than $2^\lambda$ additions are performed, the size of the counter is also a constant, limited by $\lambda$ bits. This is also true of the witnesses for membership.

5 Vector Commitments

The starting point of a new vector commitment is the insert-only accumulator designed in Section 5. Recall that the accumulator A to the set X=$\{x_i\}_{i \in [q]}$ takes the form $$A_X = \left(g^{\Sigma_{i \in [q]\backslash\{k\}} x_i \Pi_{j \in [q]\backslash\{i\}} z_j}, g^{\Pi_{i \in [q]\backslash\{k\}} z_i}, q\right)$$

where $z_i$ are random odd strings. The witness for membership of an element $x_k \in X$ would be $$w_{x_k} = \left(g^{\Sigma_{i \in [q]\backslash\{k\}} x_i \Pi_{j \in [q]\backslash\{i,k\}} z_j}, g^{\Pi_{i \in [q]\backslash\{k\}} z_i}, k\right)$$

which can be the accumulator of all the other elements in X. The strings $z_i$ can be publicly generated (e.g., by some pseudorandom function). In some cases, various embodiments may not require any real randomness in the $z_i$s, just that there is some concise representation of them. This can be because embodiments can publish the key for the pseudorandom function to enable public evaluation.

The crucial observation is the accumulator is sensitive to the order in which elements are added. This order can be thought of as specifying the index in the vector that is being committed. Furthermore, since the $z_i$s can be generated publicly, there is no a priori bound on the size of the vector that is being committed. Furthermore, the exponent is linear in the messages that are being committed. Thus, in order to change the message committed at index i by $\delta$, it is enough to perform the following operation:

$$A_{X',1} = A_{X,1} \cdot g^{\delta \Pi_{k \in [q]\backslash\{k\}} z_j}$$

This means that one only need know the index i and $\delta$ in order to perform an update on the ith message in vector. Let $$\beta = g^{\delta \Pi_{k \in [q]\backslash\{k\}} z_j}$$

Firstly, note that $\beta$ can be generated publicly. But, this would be a computationally intensive task—one would have to generate all the $z_j$s for $j \in [q]\backslash\{i\}$ and then perform q−1 exponentiations. However, notice that $w_{x_i,2}=\beta$ Thus, if it is assumed that the party involved in the update of the ith element has access to $w_{x_i}$, then it can be assumed that there is access to $\beta$ and $\beta$ does not need to be recomputed every time an update is issued. However, this limitation can be solved. For instance, in the case of a blockchain, a sender who wants to send another user some funds will not be able to update the vector commitment corresponding to the changes reflected in the recipient's account efficiently unless they have access to the witness of the recipient.

If an update at index i is performed, the witness corresponding to the ith message does not change. For k≠i, the witness for membership of the element $x_k$ can be updated by performing the following operation:

$$w'_{x_k,1} = w_{x_k,1} \cdot g^{\delta \Pi_{k \in [q]\backslash\{i,k\}} z_j}$$

$$\gamma = g^{\Pi_{k \in [q]\backslash\{i,k\}} z_j}$$

$\gamma$ can be generated publicly. However, this may be a computationally intensive task. For example, all the $z_j$s for $j \in [q]\backslash\{i,k\}$ may need to be generated and then q−2 exponentiations may be performed.

For this purpose, various embodiments can make the $z_i$s special. The $z_i$s can be generated using a key-homomorphic pseudorandom function [BLMR15]. $z_i=F_{K_i}(\chi)$ can be defined for some value $\zeta$, where $K_i$ is derived from i in some public deterministic way (e.g., utilizing an additional pseudorandom function). A key-homomorphic property can include:

$z_i \cdot z_j = F_{K_i+K_j}(\chi)$

In this way, if the following were to be kept as part of the vector commitment, $$\Delta = \sum_{i \in [q]} K_i$$

given i, k, then one can efficiently compute β and γ defined above. A way to realize this, according to various embodiments, is to consider the function $$z_i = \alpha^{\zeta_i}$$

where $\zeta_i$s are random odd strings and α is a fixed random string. Then keep, the following can be kept as a part of the vector commitment, $$\Delta = \sum_{i \in [q]} \zeta_i$$

Now, the following difficult computational task is presented, but can be solved by embodiments. Given g,α,Δ, compute $$y = g^{\alpha^\Delta}$$

This appears difficult to do efficiently without knowing ord(G). Notice that given $\alpha^\Delta$ mod ord(G), y would be easy to compute. There however does not seem to be a way to enable users to compute $\alpha^\Delta$ mod ord(G) without having them learn ord(G) which would compromise the security of the scheme. Suppose the bit-length of Δ is at most m, one could enable this computation by publishing for i∈[m]:

$$y_i = g^{\alpha^{2^i}}$$

and then one can efficiently compute:

$$y = \prod_{i \in [m]: \Delta_i = 1} y_i$$

However, note that computing each $y_i$ even to setup the vector commitment would not be efficient unless ord(G) is known. This can be done, for example, in RSA groups where during setup, the prime factorization of the Blum integer N is known. This can be used to compute ord(G)=ϕ(N). But, in general, GGen may not ever have access to the order of the group. Embodiments can solve this by allowing GGen to also output a random large multiple of the order of the group. The conjecture is that, based on the factoring assumption, it will still be hard to recover ord(G). If GGen ever gets explicit access to ord(G) during its computations, as in the setup of RSA groups, this is certainly achievable. Even in the case that it does not, one can certainly conceive that it might be possible to generate a random large multiple of ord(G) without having access to ord(G). Given this large multiple, say Γ, compute $\alpha^\Delta$ mod Γ can be computed efficiently given α and A and then use that to compute y. Note that $$y = g^{\alpha^\Delta \bmod \Gamma}$$

This is because, for any a,b,c, (a mod b) mod c=a mod c if there exists an η∈N such that b=cη. Since there exists an η such that Γ=η·ord(G), $$y = g^{\alpha^\Delta \bmod \Gamma} = g^{(\alpha^\Delta \bmod \Gamma) \bmod \text{ord}(G)} = g^{\alpha^\Delta \bmod \text{ord}(G)} = g^{\alpha^\Delta}$$

This modified group generation procedure is formalized below followed by a description of vector commitment procedures according to embodiments. The definition from [CF13] can be modified in order to accommodate the commitment of messages in indices of the vector that have not been used before, using the method Add. Owing to the modifications in the construction, embodiments may need slightly modified hardness assumptions in order to prove position binding.

5.1 Modified Group Generation

Existence of a randomized polynomial-time algorithm GGen'(λ), can be assumed, that takes as input the security parameter λ and outputs three integers a,b,Γ along with the description of a group G of unknown order in the range [a,b] such that a,b and a-b are all integers exponential in λ, and Γ=η·ord(G) where η is a random integer exponential in λ.

5.2 Construction

KeyGen($1^\lambda$): Sample the description of a group $$G \xleftarrow{\$} GGen'(\lambda)$$

of unknown order in the range [a,b] where a, b and a-b are exponential in λ along with an integer Γ=η·ord(G) where η is a random integer exponential in λ. Sample a random element $$g \xleftarrow{\$} G$$

and a random prime $$\alpha \xleftarrow{\$} \text{Primes}(m+1)\backslash[0,b].$$

Note that a random element of $\mathbb{G}$ would be a generator of $\mathbb{G}$ with overwhelming probability, and at the very least, would not be of low order. Let |b 1|=m. Sample the description of a hash function H that maps λ-bit numbers to unique primes from the set Primes(m+1)\[0,b]. Set M=[0,a). Output (pp,C)=((G,g,α,H,a,b,Γ),(1,g,0,0)).

$\text{Com}_{pp}(x_1, \ldots, x_q)$: Compute

- For $i \in [q]$, $z_i = \alpha^{H(i)} \bmod \Gamma$
- $C_1 = g^{\sum_{i \in [q]} x_i \prod_{j \in [q]\backslash\{i\}} z_j}$
- $C_2 = g^{\prod_{k \in [q]} z_i}$
- $C_3 = q$
- $C_4 = \sum_{i \in [q]} H(i)$ Output C=($C_1$,$C_2$,$C_3$,$C_4$) and aux=($x_1$, ..., $x_q$).

$\text{Open}_{pp}(x,i,\text{aux})$: Let aux=($x_1$, ..., $x_q$). If $x \neq x_q$, output ⊥. Otherwise, compute For $j \in [q]\backslash\{i\}$, $$z_j = \alpha^{H(j)} \bmod \Gamma$$

- $\Lambda_{i,1} = g^{\sum_{j \in [q]\backslash\{i\}} x_j \prod_{k \in [q]\backslash\{i,j\}} z_k}$
- $\Lambda_{i,2} = g^{\prod_{j \in [q]\backslash\{i\}} z_j}$
- $\Lambda_{i,3} = i - 1$
- $\Lambda_{i,4} = \sum_{j \in [q]\backslash\{i\}} H(j)$ $\Lambda_{i,4} = \Sigma_{j \in [q] \setminus \{i\}} H(j)$ Output $\Lambda_i = (\Lambda_{i,1}, \Lambda_{i,2}, \Lambda_{i,3}, \Lambda_{i,4})$.

Add$_{pp}$(C,x,i): If i≠$C_3$+1, output ⊥. Let $$z_i = \alpha^{H(i)} \bmod \Gamma$$

Set $$C' = (C_1^{z_1} \cdot C_2^x, C_2^{z_i}, i, C_4 + H(i))$$

Output (C',upms =(add,x,i)).

OpenOnAdd$_{pp}$(C',x,i): On an execution of Add$_{pp}$(C,x,i), OpenOnAdd$_{pp}$(C',x,i) outputs $\Lambda_i$=C.

Update$_{pp}$(C,δ,i): If it is not the case that 0≤i<$C_3$, output ⊥. Compute $$\Delta_i = C_4 - H(i)$$

and $$y_i = \alpha^{\Delta_i} \bmod \Gamma$$

Set $$C_1' = C_1 \cdot g^{\delta \cdot y_i}$$

and $$C' = (C_1', C_2, C_3, C_4)$$

Output (C',upmsg=(upd,δ,i)).

ProofUpdate$_{pp}$(C,$\Lambda_i$,upmsg): Parse upmsg. If i=upmsg$_3$, output $\Lambda_i' = \Lambda_i$ Otherwise, the following cases are present:

upmsg$_1$=add: Let $$z_i = \alpha^{H(i)} \bmod \Gamma$$

Set $$\Lambda_i' = (\Lambda_{i,1}^{z_i} \cdot \Lambda_{i,2}^{upmsg_2}, \Lambda_{i,2}^{z_i}, \Lambda_{i,3}, \Lambda_{i,4} + H(i))$$

upmsg$_1$=upd: Compute $$\Delta_i = \Lambda_{i,4} - H(i)$$

and $$y_i = \alpha^{\Delta_i} \bmod \Gamma$$

Set $$\Lambda_{i,1}' = \Lambda_{i,1} \cdot g^{\delta \cdot y_i}$$

and $$\Lambda_i' = (\Lambda_{i,1}', \Lambda_{i,2}, \Lambda_{i,3}, \Lambda_{i,4})$$

Output $\Lambda_i'$.

Ver$_{pp}$(C,x,i,$\Lambda_i$): Parse the inputs C=($C_1,C_2,C_3,C_4$) and $\Lambda_i = (\Lambda_{i,1}, \Lambda_{i,2}, \Lambda_{i,3}, \Lambda_{i,4})$.
Let $$z_i \alpha^{H(\Lambda_{i,3}+1)} \bmod \Gamma$$

Check whether:

$$0 \leq x < a$$

$$\Lambda_{i,4} + H(i) = C_4$$

$$0 \leq \Lambda_{i,3} < C_3$$

$(\Lambda_{i,2})^{\gamma_i} = C_2$
$(\Lambda_{i,1})^{\gamma_i} \cdot (\Lambda_{i,2})^x = C_1$ If so, output 1. Otherwise, output 1.

5.3 Completeness and Efficiency

The correctness of the scheme follows directly from inspection. Also, all operations involve (at the most) one hash computation, four exponentiations and one multiplication. The size of the accumulator is constant, namely, two group elements, aside from a counter that keeps track of the number of elements that have been added to the accumulator and a sum of hashes, which grow logarithmically. Assuming that not more than $2^\lambda$ additions are performed, the size of the counter and the hash-sum is also a constant, limited by (2λ+m+2) bits. This is also true of the witnesses for membership.

Embodiments provide for a number of advantages. For example, embodiments provide for efficient storage of data. In particular, user states can be accumulated into an accumulated state. The accumulated state, which is a binding commitment to a set of elements (e.g., user states), compactly stores data that can be used to verify if a user has a sufficient amount (e.g., a first user state element) for an interaction. The accumulated state can be small in size, such that it can easily be included into each block of the blockchain. For example, the accumulated state can be included in the block header of each block, thus allowing every node in the verification network to easily verify user states.

Embodiments provide for a number of additional advantages. The number of sender accounts in a blockchain network is usually large. Ethereum has about 70 million accounts even though the throughput of the blockchain is not high (e.g., 5-10 transactions per second). Fast access to such a large number of accounts requires significant resources, limiting the number of nodes that could perform validator functions. Embodiments solve this problem and allow for networks that want to spread far and wide without entrusting a few computers. Embodiments allow not only a few select high computationally powered computers be validator nodes. Embodiments allow for end users, with access to an ordinary laptop or mobile phone, to act as validator computers as well.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

6 References

[BBF18] Dan Boneh, Benedikt Bunz, and Ben Fisch. Batching techniques for accumulators with applications to iops and stateless blockchains. IACR Cryptology ePrint Archive, 2018:1188, 2018.
[BCD+17] Foteini Baldimtsi, Jan Camenisch, Maria Dubovitskaya, Anna Lysyanskaya, Leonid Reyzin, Kai Samelin, and Sophia Yakoubov. Accumulators with applications to anonymity-preserving revocation. In 2017 IEEE European Symposium on Security and Privacy, EuroS&P 2017, Paris, France, Apr. 26-28, 2017, pages 301 {315, 2017.
[bit] Bitcoin. bitcoin.org/.
[BLMR15] Dan Boneh, Kevin Lewi, Hart William Montgomery, and Ananth Raghunathan. Key homomorphic prfs and their applications. IACR Cryptology ePrint Archive, 2015:220, 2015.
[BLW17] Dan Boneh, Kevin Lewi, and David J. Wu. Constraining pseudorandom functions privately. In Public-Key Cryptography—PKC 2017-20th IACR International Conference on Practice and Theory in Public-Key Cryptography, Amsterdam, The Netherlands, Mar. 28-31, 2017, Proceedings, Part II, pages 494 {524, 2017.
[CF13] Dario Catalano and Dario Fiore. Vector commitments and their applications. In Public-Key Cryptography—PKC 2013-16th International Conference on Practice and Theory in Public-Key Cryptography, Nara, Japan, Feb. 26-Mar. 1, 2013. Proceedings, pages 55-72, 2013.
[CH10] Philippe Camacho and Alejandro Hevia. On the impossibility of batch update for cryptographic accumulators. In Progress in Cryptology-LATINCRYPT 2010, First International Conference on Cryptology and Information Security in Latin America, Puebla, Mexico, Aug. 8-11, 2010, Proceedings, pages 178 {188, 2010.
[CS99] Ronald Cramer and Victor Shoup. Signature schemes based on the strong RSA assumption. In CCS '99, Proceedings of the 6th ACM Conference on Computer and Communications Security, Singapore, Nov. 1-4, 1999, pages 46 {51, 1999.
[etha] Etherchain. Evolution of the total number of Ethereum accounts. www.etherchain.org/charts/totalAccounts.
[ethb] Ethereum. www.ethereum.org/.
[ethc] Etherscan. etherscan.io/.
[FT14] Pierre-Alain Fouque and Mehdi Tibouchi. Close to uniform prime number generation with fewer random bits. In Automata, Languages, and Programming-41st International Colloquium, ICALP 2014, Copenhagen, Denmark, Jul. 8-11, 2014, Proceedings, Part I, pages 991 {1002, 2014.
[GGM84] Oded Goldreich, Sha Goldwasser, and Silvio Micali. How to construct random functions (extended abstract). In 25th Annual Symposium on Foundations of Computer Science, West Palm Beach, Fla., USA, 24-26 Oct. 1984, pages 464 {479, 1984. 36
[HILL99] Johan Hastad, Russell Impagliazzo, Leonid A. Levin, and Michael Luby. A pseudorandom generator from any one-way function. SIAM J. Comput., 28(4):1364 {1396, 1999.
[HW09] Susan Hohenberger and Brent Waters. Short and stateless signatures from the RSA assumption. In Advances in Cryptology-CRYPTO 2009, 29th Annual International Cryptology Conference, Santa Barbara, Calif., USA, Aug. 16-20, 2009. Proceedings, pages 654 {670, 2009.
[lib] Libra. libra.org/.
[Lip12] Helger Lipmaa. Secure accumulators from euclidean rings without trusted setup. In Applied Cryptography and Network Security-10th International Conference, ACNS 2012, Singapore, Jun. 26-29, 2012. Proceedings, pages 224 {240, 2012.
[NRR02] Moni Naor, Omer Reingold, and Alon Rosen. Pseudorandom functions and factoring. SIAM J. Comput., 31(5):1383 {1404, 2002.
[Wes19] Benjamin Wesolowski. Ecient veriable delay functions. In Advances in Cryptology-EUROCRYPT 2019-38th Annual International Conference on the Theory and Applications of Cryptographic Techniques, Darmstadt, Germany, May 19-23, 2019, Proceedings, Part III, pages 379 {407, 2019.

What is claimed is:

1. A method comprising:
receiving, by a validation computer in a system with millions of users, an authorization request message from a user device over a computer network, wherein the authorization request message comprises a user state and a user proof, wherein the user state comprises a first user state element and a second user state element, and wherein the user proof comprises a first user proof element, a second user proof element, and a third user proof element;
computing, by the validation computer, a first verification value by multiplying the first user proof element raised to the power of the second user state element, and the second user proof element raised to the power of the first user state element, wherein the first verification value is a generator raised to a power that is based on amounts and random values of each user in the system;
computing, by the validation computer, a second verification value by raising the second user proof element to the power of the second user state element, wherein the second verification value is the generator raised to a power based on the random values, but without the amounts;

comparing, by the validation computer, the first verification value to a first accumulated state element of an accumulated state;
comparing, by the validation computer, the second verification value to a second accumulated state element of the accumulated state; and
authorizing, by the validation computer, the authorization request message if the first verification value matches the first accumulated state element and the second verification value matches the second accumulated state element.

2. The method of claim 1, wherein the authorization request message comprises an interaction amount, and wherein the method further comprises:
updating, by the validation computer, the accumulated state based on the interaction amount.

3. The method of claim 2, wherein updating the accumulated state based on the interaction amount further comprises:
computing, by the validation computer, an updated first accumulated state element by multiplying 1) the first accumulated state element and 2) the second user proof element raised to the power of the interaction amount.

4. The method of claim 1, wherein the first user state element is an amount associated with a user, the second user state element is a random number, and the third user proof element indicates which of a number of entries in an accumulated state the user is associated with.

5. The method of claim 1, wherein prior to receiving the authorization request message, the user device generates the authorization request message, the authorization request message requesting authorization for an interaction between the user device and a receiver device.

6. The method of claim 1 further comprising:
comparing, by the validation computer, the third user proof element to a third accumulated state element of an accumulated state.

7. The method of claim 6, wherein authorizing the authorization request message includes:
authorizing, by the validation computer, the authorization request message if the first verification value matches the first accumulated state element, the second verification value matches the second accumulated state element, and the third user proof element matches the third accumulated state element.

8. The method of claim 1, wherein the first user proof element is derived from a plurality of first user state elements and a plurality of second user state elements associated with a plurality of user states, and wherein the second user proof element is derived from the plurality of second user state elements associated with the plurality of user states.

9. The method of claim 1, wherein the validator computer maintains a blockchain in a verification network, wherein the accumulated state is stored in each block of the blockchain.

10. A validation computer in a system with millions of users comprising:
a processor;
a memory; and
a computer-readable medium coupled to the processor, the computer-readable medium comprising code executable by the processor for implementing a method comprising:
receiving an authorization request message from a user device, wherein the authorization request message comprises a user state and a user proof, wherein the user state comprises a first user state element and a second user state element, and wherein the user proof comprises a first user proof element, a second user proof element, and a third user proof element;
computing a first verification value by multiplying the first user proof element raised to the power of the second user state element, and the second user proof element raised to the power of the first user state element, wherein the first verification value is a generator raised to a power that is based on amounts and random values of each user in the system;
computing a second verification value by raising the second user proof element to the power of the second user state element, wherein the second verification value is the generator raised to a power based on the random values, but without the amounts;
comparing the first verification value to a first accumulated state element of an accumulated state;
comparing the second verification value to a second accumulated state element of the accumulated state; and
authorizing the authorization request message if the first verification value matches the first accumulated state element and the second verification value matches the second accumulated state element.

11. The validation computer of claim 10, wherein the first user state element is an amount associated with a user, the second user state element is a random number, the third user proof element indicates which of a number of entries in an accumulated state the user is associated with, and wherein the first user proof element is derived from a plurality of first user state elements and a plurality of second user state elements associated with a plurality of user states, and wherein the second user proof element is derived from the plurality of second user state elements associated with the plurality of user states.

12. The validation computer of claim 10, wherein the authorization request message is a request to authorize an interaction and comprises an interaction amount.

13. The validation computer of claim 12, wherein the user device updates the user proof based on the interaction amount, and wherein the method further comprises:
updating, by the validation computer, the accumulated state based on the interaction amount.

14. The validation computer of claim 12, wherein after authorizing the authorization request message, the method further comprises:
including, by the validation computer, at least the interaction amount into a new block of a blockchain maintained by the validation computer.

15. The validation computer of claim 10, wherein after authorizing the authorization request message, the method further comprises:
generating, by the validation computer, an authorization response message indicating whether or not the authorization request message is authorized; and
providing, by the validation computer, the authorization response message to the user device.

16. The validation computer of claim 15, wherein the user device provides the authorization response message to a receiver device with which the user device initiated an interaction.

17. The validation computer of claim 10, wherein the method further comprises:
retrieving, by the validation computer, the accumulated state comprising the first accumulated state element and the second accumulated state element from a previous block in a blockchain maintained by the validation computer.

18. A method comprising:

generating, by a user device, an authorization request message comprising a user state and a user proof, wherein the user state comprises a first user state element and a second user state element, and wherein the user proof comprises a first user proof element, a second user proof element, and a third user proof element;

providing, by the user device, the authorization request message to a validation computer of a plurality of validation computers in a system with millions of users, wherein the validation computer 1) computes a first verification value by multiplying the first user proof element raised to the power of the second user state element, and the second user proof element raised to the power of the first user state element, wherein the first verification value is a generator raised to a power that is based on amounts and random values of each user in the system, 2) computes a second verification value by raising the second user proof element to the power of the second user state element, wherein the second verification value is the generator raised to a power based on the random values, but without the amounts, 3) compares the first verification value to a first accumulated state element of an accumulated state, 4) compares the second verification value to a second accumulated state element of the accumulated state, and 5) authorizes the authorization request message if the first verification value matches the first accumulated state element and the second verification value matches the second accumulated state element; and receiving, by the user device, an authorization response message from the validation computer, wherein the authorization response message indicates whether or not the authorization request message was authorized.

19. The method of claim 18 further comprising:

prior to generating the authorization request message, updating, by the user device, the user proof based on interactions included in a blockchain since a last time the user proof was updated.

20. The method of claim 18, wherein the authorization request message requests authorization for an interaction between the user device and a receiver device, wherein the authorization request message comprises an interaction amount, and wherein the method further comprises:

providing, by the user device, the authorization response message to the receiver device.

* * * * *